US011626102B2

(12) United States Patent
Kondo et al.

(10) Patent No.: US 11,626,102 B2
(45) Date of Patent: Apr. 11, 2023

(54) SIGNAL SOURCE IDENTIFICATION DEVICE, SIGNAL SOURCE IDENTIFICATION METHOD, AND PROGRAM

(71) Applicant: NEC Corporation, Tokyo (JP)

(72) Inventors: Reishi Kondo, Tokyo (JP); Yuzo Senda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 191 days.

(21) Appl. No.: 16/971,091

(22) PCT Filed: Mar. 9, 2018

(86) PCT No.: PCT/JP2018/009234
§ 371 (c)(1),
(2) Date: Aug. 19, 2020

(87) PCT Pub. No.: WO2019/171580
PCT Pub. Date: Sep. 12, 2019

(65) Prior Publication Data
US 2020/0395002 A1 Dec. 17, 2020

(51) Int. Cl.
*G10L 15/02* (2006.01)
(52) U.S. Cl.
CPC .................... *G10L 15/02* (2013.01)
(58) Field of Classification Search
CPC ....... G06N 20/00; G10L 15/02; G10L 21/028; G10L 25/51
USPC ........................................................ 704/231
See application file for complete search history.

(56) References Cited

U.S. PATENT DOCUMENTS 7,035,742 B2 * 4/2006 Klefenz ................. G10H 3/125
381/58
8,428,949 B2 * 4/2013 Neoran .................. G10L 25/48
704/254
8,676,935 B2 * 3/2014 Senda ................. H04N 17/004
709/219

(Continued)

FOREIGN PATENT DOCUMENTS

JP 2007-327937 A 12/2007
JP 2008-079256 A 4/2008
(Continued)

OTHER PUBLICATIONS

International Search Report for PCT Application No. PCT/JP2018/009234, dated May 22, 2018.
(Continued)

*Primary Examiner* — Quynh H Nguyen
(74) *Attorney, Agent, or Firm* — Sughrue Mion, PLLC

(57) ABSTRACT

A signal source identification device includes: a feature value calculation unit configured to calculate feature values corresponding to paths where signals from generation sources of the signals transmit, based on signals received by a plurality of sensors; and an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit.

11 Claims, 28 Drawing Sheets

(56) References Cited

U.S. PATENT DOCUMENTS

| | | | | |
|---|---|---|---|---|
| 8,886,530 | B2* | 11/2014 | Nakadai | G10L 21/06 704/235 |
| 9,378,752 | B2* | 6/2016 | Oliveira | G10L 15/26 |
| 9,595,259 | B2* | 3/2017 | Mizumoto | G06V 40/171 |
| 9,786,295 | B2* | 10/2017 | Nakamura | G10L 15/08 |
| 10,283,115 | B2* | 5/2019 | Gomez | G10L 21/028 |
| 10,622,008 | B2* | 4/2020 | Nakamura | G10L 25/78 |
| 2005/0038635 | A1* | 2/2005 | Klefenz | G10H 3/125 702/189 |
| 2007/0160230 | A1* | 7/2007 | Nakagomi | H04R 3/005 381/102 |
| 2007/0265743 | A1* | 11/2007 | Kojitani | G06T 7/0004 701/32.9 |
| 2010/0004926 | A1* | 1/2010 | Neoran | G10L 25/48 704/201 |
| 2010/0318635 | A1* | 12/2010 | Senda | H04N 17/004 709/219 |
| 2012/0330113 | A1* | 12/2012 | Kogure | A61B 5/11 600/595 |
| 2012/0330659 | A1* | 12/2012 | Nakadai | G10L 21/06 704/E15.044 |
| 2014/0067385 | A1* | 3/2014 | Oliveira | G10L 25/78 704/226 |
| 2016/0064000 | A1* | 3/2016 | Mizumoto | G06T 7/73 704/233 |
| 2017/0040030 | A1* | 2/2017 | Nakamura | G10L 25/78 |
| 2017/0092284 | A1* | 3/2017 | Nakamura | G10L 21/003 |
| 2018/0061398 | A1* | 3/2018 | Gomez | G10L 15/063 |
| 2020/0395002 | A1* | 12/2020 | Kondo | G10L 25/51 |

FOREIGN PATENT DOCUMENTS

| | | |
|---|---|---|
| JP | 2014-092750 A | 5/2014 |
| JP | 2017-032857 A | 2/2017 |

OTHER PUBLICATIONS

T. Komatsu, Y. Senda and R. Kondo, "Acoustic event detection based on non-negative matrix factorization with mixtures of local dictionaries and activation aggregation," 2016 IEEE International Conference on Acoustics, Speech and Signal Processing (ICASSP), Shanghai, 2016, pp. 2259-2263.

* cited by examiner

SIGNAL SOURCE IDENTIFICATION DEVICE, SIGNAL SOURCE IDENTIFICATION METHOD, AND PROGRAM

This application is a National Stage Entry of PCT/JP2018/009234 filed on Mar. 9, 2018, the contents of all of which are incorporated herein by reference, in their entirety.

TECHNICAL FIELD

The present invention relates to a signal source identification device, a signal source identification method, an event detection device, an event detection method, an audio recognition device, an audio recognition method, and a program

BACKGROUND ART

There is known a detection technique for, upon receiving a signal due to various kinds of waves and vibrations such as sound waves and radio waves, identifying an event that is the cause of generation of the signal.

One example of such a technique is described in Non-Patent Document 1. In Non-Patent Document 1, an acoustic event detection technique is described which is for, based on the sound of a sound source having been sounded, identifying an acoustic event that is the cause of the sound source. To be specific, in Non-Patent Document 1, a technique is described in which a sound corresponding to an acoustic event is learned in advance and identification is performed based on matching of the statistical feature of an input signal with the learned feature at the time of detection.

Further, a technique related to the technique described in Non-Patent Document 1 is described in Patent Document 1, for example. In Patent Document 1, an acoustic signal processing device that estimates the position of a sound source is described. According to Patent Document 1, the acoustic signal processing device has a calculating unit and an estimating unit. For example, the calculating unit calculates a feature value based on a received sound signal. The estimating unit selects a feature value model based on the distance between the feature value calculated by the calculating unit and a previously determined representative value. Then, the estimating unit estimates a position candidate corresponding to the selected feature value model as the position of the sound source. Moreover, in Patent Document 1, a method of estimating the position of a sound source by a statistical method is described.

Patent Document 1: Japanese Unexamined Patent Application Publication No. JP-A 2008-079256

Non-Patent Document 1: T. Komatsu, Y Senda and R. Kondo, "Acoustic event detection based on non-negative matrix factorization with mixtures of local dictionaries and activation aggregation," 2016 IEEE International Conference on Acoustics, Speech and Signal Processing (ICASSP), Shanghai, 2016, pp. 2259-2263.

Feature values calculated based on received signals spread in accordance with the frequency characteristics of the signals. Meanwhile, in the techniques described in Patent Document 1 and Non-Patent Document 1, there is a possibility that the spread in accordance with the frequency characteristics cannot be properly considered. As a result, for example, when discriminating an output by a previously determined signal source is desired, there is a fear that a desired detection result cannot be obtained.

Thus, there is a problem that it is difficult to discriminate whether or not a received signal is a signal output by a previously determined signal source.

SUMMARY

Accordingly, an object of the present invention is to provide a signal source identification device, a signal source identification method, an event detection device, an event detection method, an audio recognition device, an audio recognition method and a program which solve the problem that it is difficult to discriminate whether or not a signal is a signal output by a previously determined signal source.

In order to achieve the object, a signal identification device according to an aspect of the present invention includes: a feature value calculation unit configured to calculate feature values corresponding to paths where signals from generation sources of the signals transmit, based on signals received by a plurality of sensors; and an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit.

Further, a signal source identification method according to another aspect of the present invention is executed by a signal source identification device, and the method includes: calculating feature values corresponding to paths where signals from generation sources of the signals transmit, based on signals received by a plurality of sensors; and identifying whether or not a calculated feature value is a signal from a predetermined signal source by using an identification range that is a range within which feature values based on signals from the predetermined signal source fall and that is previously determined based on the calculated feature values.

Further, on a non-transitory computer-readable recording medium having a program recorded thereon according to another aspect of the present invention, the program includes instructions for causing a signal source identification device to realize: a feature value calculation unit configured to calculate feature values corresponding to paths where signals from generation sources of the signals transmit, based on signals received by a plurality of sensors; and an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit.

Further, an event detection device according to another aspect of the present invention includes: a feature value calculation unit configured to calculate feature values corresponding to paths where signals from generation sources of the signals transmit, based on signals received by a plurality of sensors; an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit; an event detection unit configured to detect an event based on a signal received by a sensor; and a correction unit configured to correct a result of the detection by the event detection unit based on a result of the identification by the signal source identification device.

Further, an event detection device according to another aspect of the present invention includes: a feature value calculation unit configured to calculate feature values corresponding to paths where signals from generation sources of the signals transmit, based on signals received by a plurality of sensors; an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit; and an event detection unit configured to detect an event based on a signal received by a sensor. The event detection unit is configured to change a threshold value used in detecting the event based on a result of the identification by the signal source identification device.

Further, an event detection method according to another aspect of the present invention is executed by an event detection device, and the method includes: calculating feature values corresponding to paths where signals from generation sources of the signals transmit, based on signals received by a plurality of sensors; identifying whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit; detecting an event based on a signal received by a sensor; and correcting a result of the detection of the event based on a result of the identification.

Further, on a non-transitory computer-readable recording medium having a program recorded thereon according to another aspect of the present invention, the program includes instructions for causing an event detection device to realize: a feature value calculation unit configured to calculate feature values corresponding to paths where signals from generation sources of the signals transmit, based on signals received by a plurality of sensors; an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit; an event detection unit configured to detect an event based on a signal received by a sensor; and a correction unit configured to correct a result of the detection by the event detection unit based on a result of the identification by the identification unit.

Further, an audio recognition device according to another aspect of the present invention includes: a feature value calculation unit configured to calculate feature values corresponding to paths where signals from generation sources of the signals transmit, based on signals received by a plurality of sensors; an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit; an audio recognition unit configured to perform audio recognition based on an acoustic signal received by a microphone serving as a sensor; and a correction unit configured to correct a result of the recognition by the audio recognition unit based on a result of the identification by the signal source identification device.

Further, an audio recognition method according to another aspect of the present invention is executed by an audio recognition device, and the method includes: calculating feature values corresponding to paths where signals from generation sources of the signals transmit, based on signals received by a plurality of sensors; identifying whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit; performing audio recognition based on an acoustic signal received by a microphone serving as a sensor; and correcting a result of the audio recognition based on a result of the identification.

Further, on a non-transitory computer-readable recording medium having a program recorded thereon according to another aspect of the present invention, the program includes instructions for causing an audio recognition device to realize: a feature value calculation unit configured to calculate feature values corresponding to paths where signals from generation sources of the signals transmit, based on signals received by a plurality of sensors; an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit;

an audio recognition unit configured to perform audio recognition based on an acoustic signal received by a microphone serving as a sensor; and a correction unit configured to correct a result of the recognition by the audio recognition unit based on a result of the identification by the identification unit.

With the configurations as described above, the present invention can provide a signal source identification device, a signal source identification method, an event detection device, an event detection method, an audio recognition device, an audio recognition method and a program which solve the problem that it is difficult to discriminate whether or not a signal is a signal output by a previously fixed signal source.

EXAMPLE EMBODIMENTS

First Example Embodiment

Figure 1:
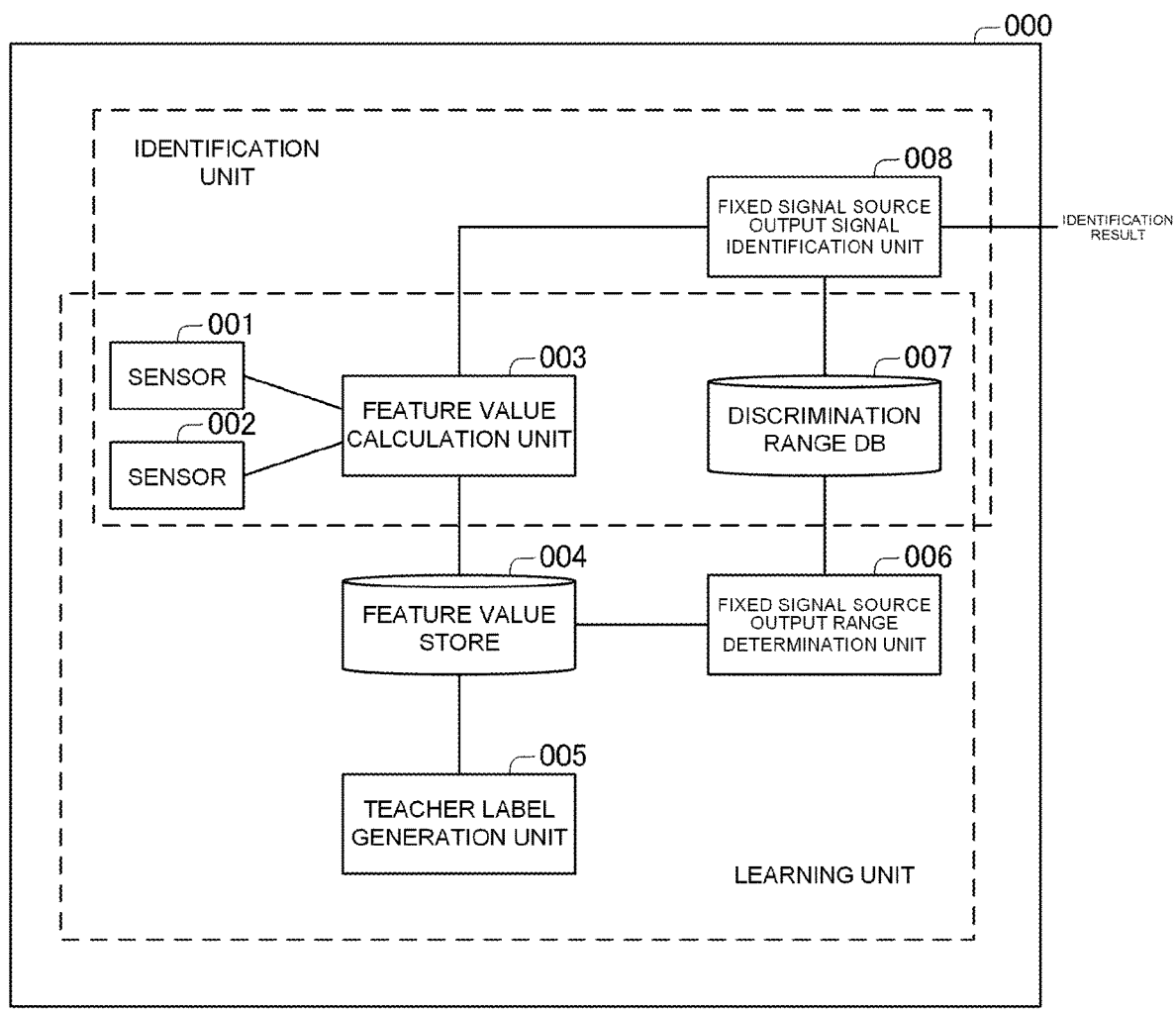
FIG. 1 is a view showing an example of the configuration of a fixed signal source identification device in a first example embodiment of the present invention.
Figure 2:
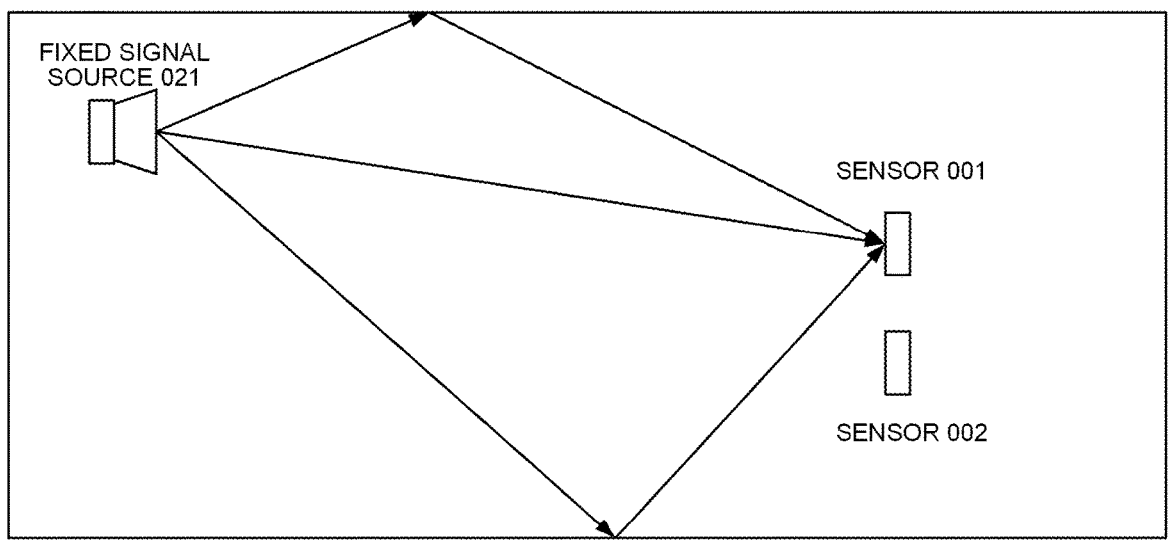
FIG. 2 is a view showing an example of the relation between a fixed signal source and a sensor.
Figure 3:
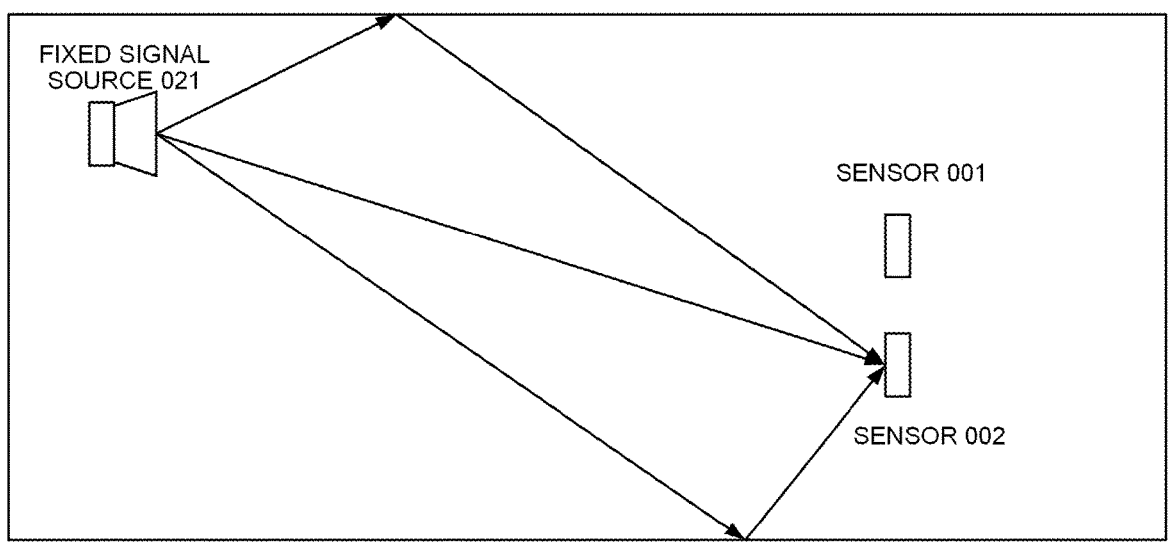
FIG. 3 is a view showing an example of the relation between the fixed signal source and another sensor.
Figure 4:
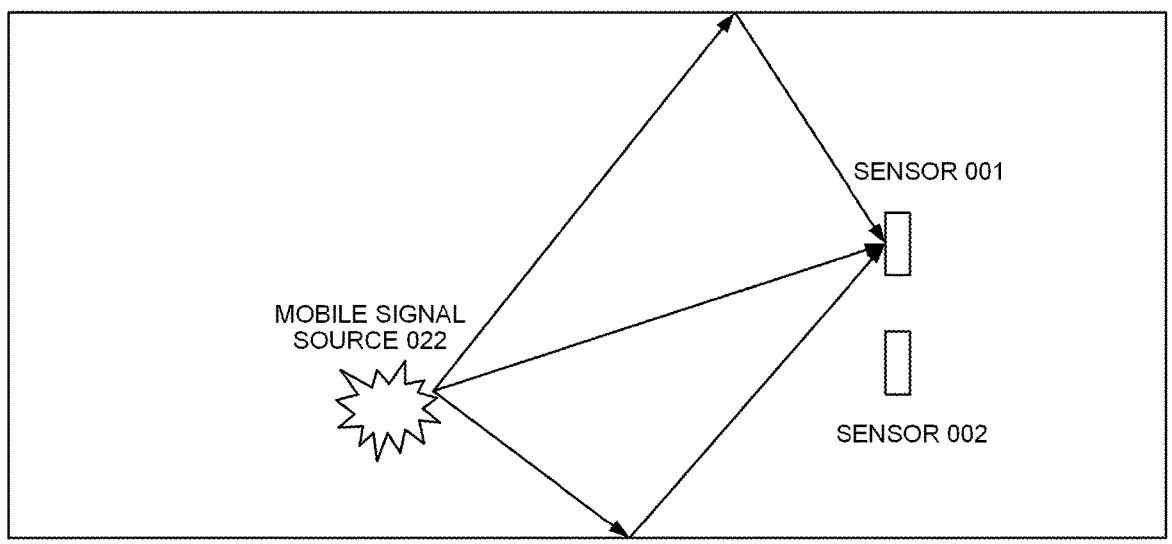
FIG. 4 is a view showing an example of the relation between a mobile signal source and the sensor.
Figure 5:
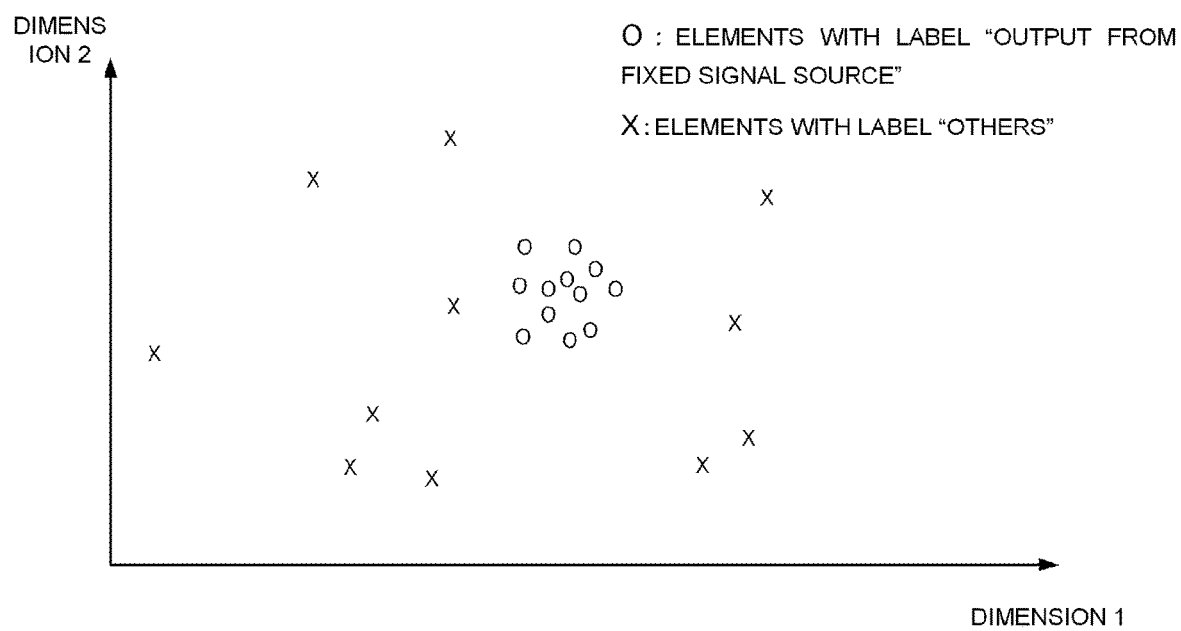
FIG. 5 is a view showing an example of the existence distribution of elements of a set recorded in a feature value store, mapped in a feature value space.
Figure 6:
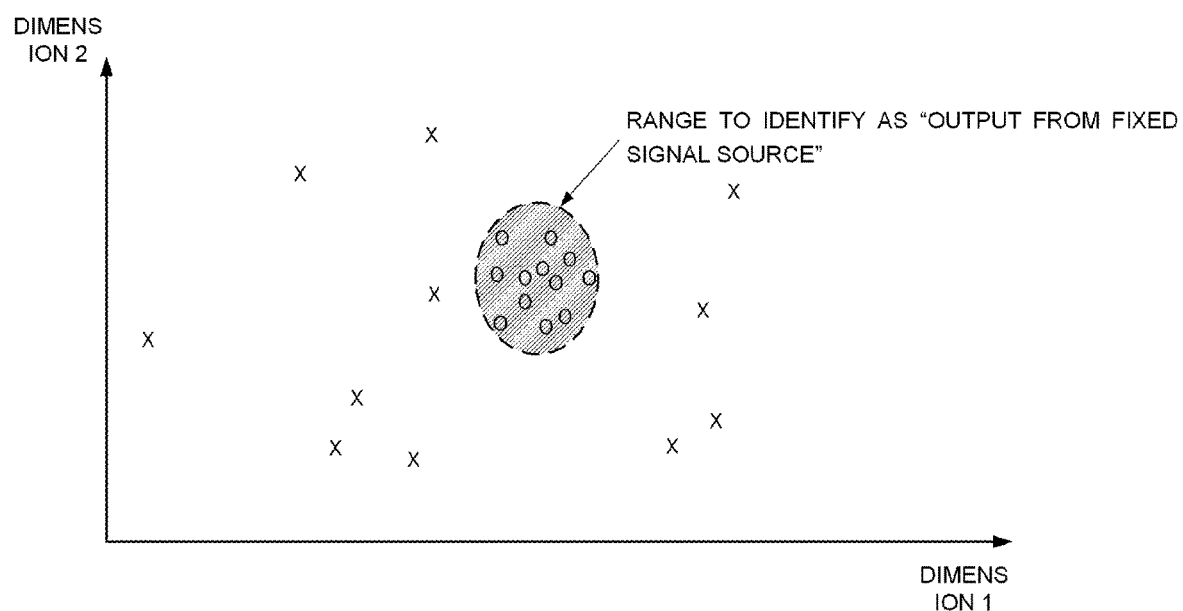
FIG. 6 is a view showing an example of an identification range determined by a fixed signal source output range determination unit.
Figure 7:
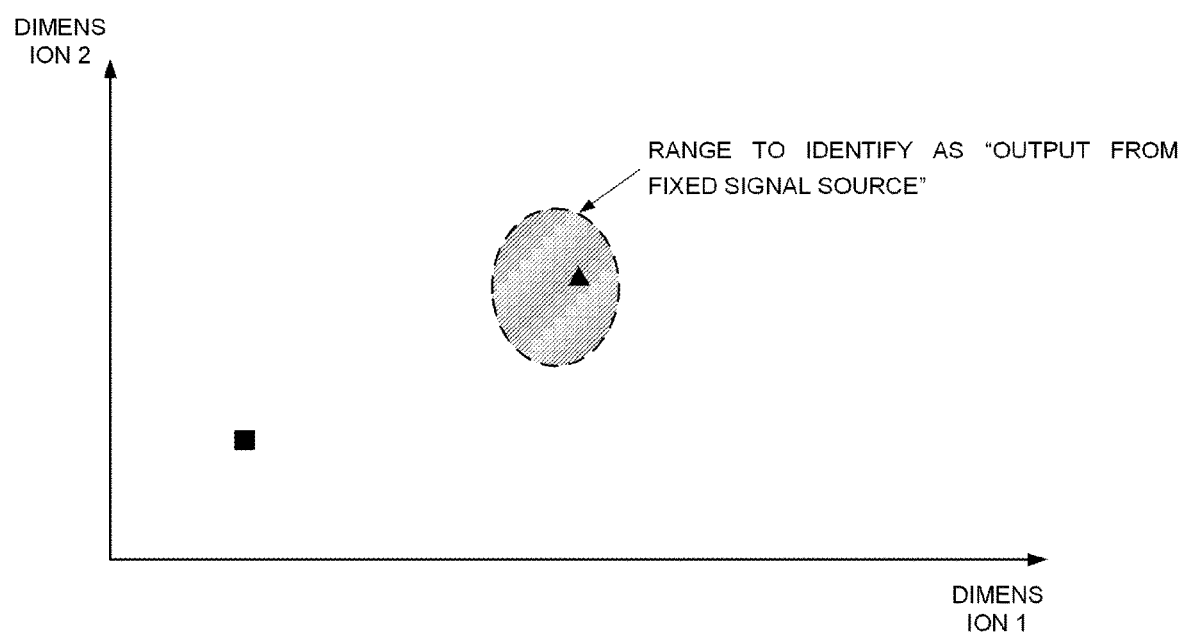
FIG. 7 is a view for describing the operation of a fixed signal source output signal identification unit.
Figure 8:
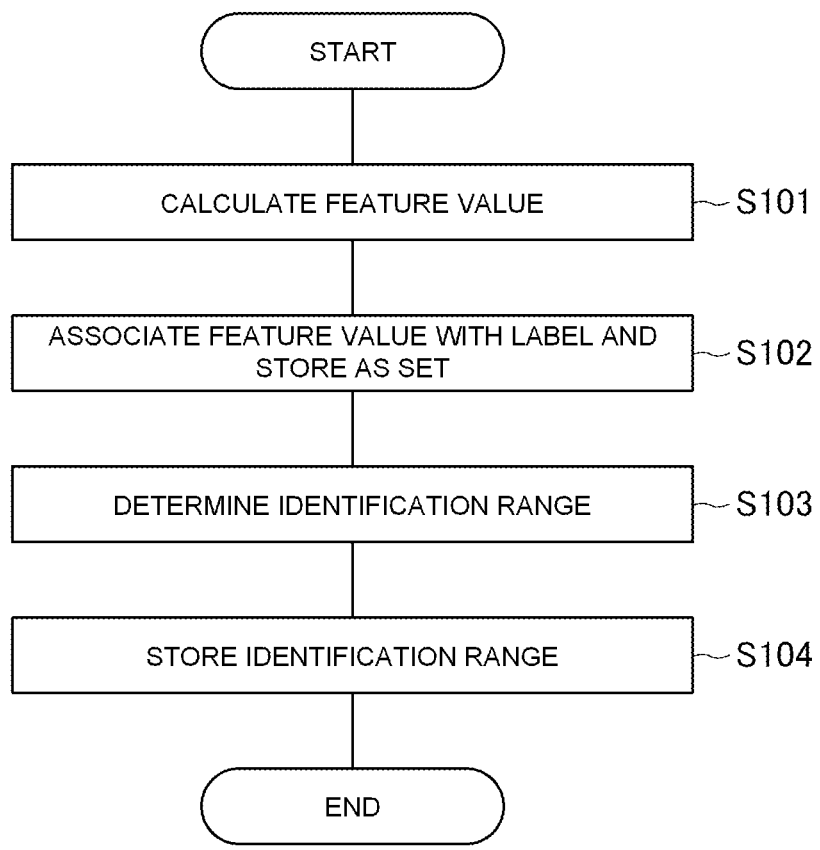
FIG. 8 is a flowchart showing an example of the operation of components corresponding to a learning unit of the fixed signal source identification device.
Figure 9:
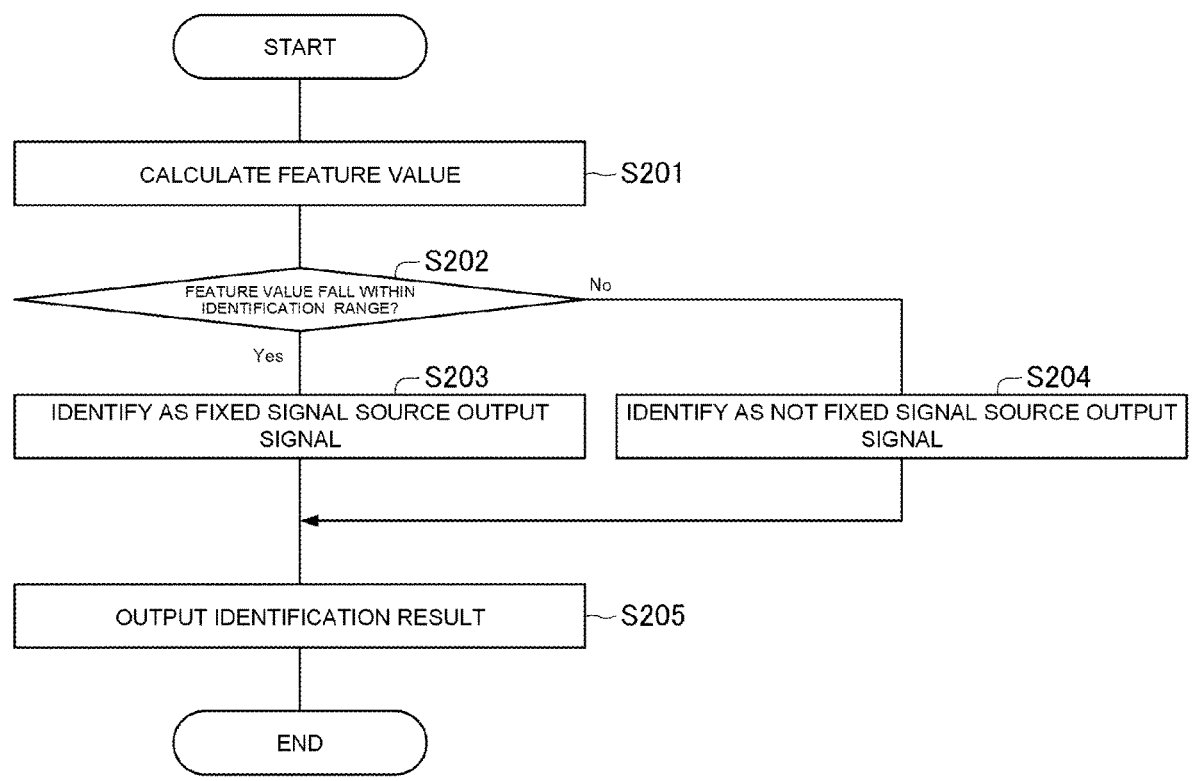
FIG. 9 is a flowchart showing an example of the operation of components corresponding to an identification unit of the fixed signal source identification device.

A first example embodiment of the present invention will be described with reference to FIGS. 1 to 9. FIG. 1 is a view showing an example of the configuration of a fixed signal source identification device 000. FIG. 2 is a view showing an example of the relation between a fixed signal source 021 and a sensor 001. FIG. 3 is a view showing an example of the relation between the fixed signal source 021 and a sensor 002. FIG. 4 is a view showing an example of the relation between a mobile signal source 022 and the sensor 001. FIG. 5 is a view showing an example of the existence distribution of elements of a set recorded in a feature value store 004, mapped in a feature value space. FIG. 6 is a view showing an example of an identification range determined by a fixed signal source output range determination unit 006. FIG. 7 is a view for describing the operation of the fixed signal source output signal identification unit 008. FIG. 8 is a flowchart showing an example of the operation of components corresponding to a learning unit of the fixed signal source identification device 000. FIG. 9 is a flowchart showing an example of the operation of components corresponding to an identification unit of the fixed signal source identification device 000.

In the first example embodiment, the fixed signal source identification device 000 that identifies whether or not a received signal is a signal from the fixed signal source 021. As will be described later, the fixed signal source identification device 000 learns an identification range that depends on the difference of signal transmission paths by using a plurality of sensors (the sensor 001 and the sensor 002). Moreover, the fixed signal source identification device 000 confirms whether or not a feature value calculated based on the received signal falls within the learned identification range. Then, the fixed signal source identification device 000 identifies whether or not the received output is an output by the fixed signal source 021 based on the result of the confirmation.

The fixed signal source identification device 000 is an information processing device which identifies whether or not a received signal is a signal from the fixed signal source 021. The fixed signal source identification device 000 receives a signal from the fixed signal source 021 (for example, a television, a speaker for broadcasting, or the like) whose installation position is fixed, for a certain amount of time, and also receives a signal from the mobile signal source 022 other than the fixed signal source 021. Then, the fixed signal source identification device 000 identifies whether or not the received signal is a signal from the fixed signal source 021.

FIG. 1 shows an example of the configuration of the fixed signal source identification device 000. Referring to FIG. 1, the fixed signal source identification device 000 includes the sensor 001, the sensor 002, a feature value calculation unit 003, the feature value store 004, a teacher label generation unit 005, the fixed signal source output range determination unit 006, a discrimination range DB (DataBase) 007, and the fixed signal source output signal identification unit 008.

The fixed signal source identification device 000 includes, for example, an arithmetic device such as a CPU that is not shown in the drawing and a storage device. For example, the fixed signal source identification device 000 realizes the abovementioned respective processing units by execution of a program stored in a storage device that is not shown in the drawing by the arithmetic device.

Of the components included by the fixed signal source identification device 000, the sensor 001, the sensor 002, the feature value calculation unit 003, the feature value store 004, the teacher label generation unit 005, the fixed signal source output range determination unit 006, and the discrimination range DB 007 configure a learning unit. The learning unit determines the range of a fixed signal source output signal that is a signal output by the fixed signal source 021 (an identification range). First, of the components included by the fixed signal source identification device 000, the components included by the learning unit will be described below.

The sensor 001 and the sensor 002 are fixed with a certain interval in the fixed signal source identification device 000 or around the fixed signal source identification device 000. The sensors 001 and 002 are configured to be able to receive a signal output by the fixed signal source 021, and obtain information of the received signal, respectively. Herein, a signal output by the fixed signal source 021 is, for example, sound waves, electric waves, vibrations, and so on. In this example embodiment, outputs by the sensors 001 and 002 can be handled as digital time-series signals. The handling of the outputs can be realized by, for example, performing A/D (Analog/Digital) conversion.

The sensor 001 and the sensor 002 are fixed with a certain interval as mentioned above. Therefore, a path in which a signal output by the fixed signal source 021 reaches the sensor 001 is different from a path in which a signal output by the fixed signal source 021 reaches the sensor 002.

FIG. 2 and FIG. 3 show examples of signal paths in a space where a signal goes straight or is specularly reflected. To be specific, FIG. 2 shows an example of the relation between the fixed signal source 021 and the sensor 001, and FIG. 3 shows an example of the relation between the fixed signal source 021 and the sensor 002. Referring to FIG. 2, a signal output by the fixed signal source 021 may reach the sensor 001 through a plurality of paths. Therefore, a signal which can be observed by the sensor 001 can be expressed as a signal obtained by convolving the signal output by the fixed signal source 021 with a transfer function dependent on a path in the corresponding space. Moreover, regarding the sensor 002, a signal output by the fixed signal source 021 may reach the sensor 002 through a plurality of paths likewise as shown in FIG. 3. As mentioned above, the sensor 001 and the sensor 002 are installed with a certain interval. Therefore, as shown in FIGS. 2 and 3, the signal path from the fixed signal source 021 to the sensor 001 and the signal path from the fixed signal source 021 to the sensor 002 differ from each other in accordance with the installation positions.

The feature value calculation unit 003 calculates a feature value that expresses a spatial path required for signal arrival and transmission every predetermined time period based on signals received by the sensors 001 and 002.

For example, the feature value calculation unit 003 calculates a cross spectrum of the sensor 001 and the sensor 002. That is, for a signal series $x1(t)$ of the sensor 001 and a signal series $x2(t)$ of the sensor 002, when the Fourier transforms of the respective signal series are set as $X1(f)$ and $X2(f)$ and the complex conjugate of $X2(f)$ is $X2^*(f)$, a cross spectrum $W(f)$ at certain time can be calculated as $W(f)=X1(f) X2^*(f)$. In other words, the feature value calculation unit 003 calculates the cross spectrum $W(f)=X1(f) X2^*(f))$ to calculate the cross spectrum of the sensor 001 and the sensor 002. The cross spectrum that is the result of calculation by the feature value calculation unit 003, or the cross spectrum that is cut out by a filter having an appropriate shape expresses the opposite of the degree of similarity, that is, the difference in transfer functions of the path from the fixed signal source 021 to the sensor 001 and the path from the fixed signal source 021 to the sensor 002.

In a case where the feature value calculation unit 003 calculates a feature value as described above, the feature value represents a spatial path required for signal arrival and transmission as mentioned above. Herein, a case of the mobile signal source 022 located at a position different from the fixed signal source 021 as shown in FIG. 4 will be assumed. In this case, a signal path from the mobile signal source 022 to the sensor 001 is different from the signal path from the fixed signal source 021 to the sensor 001. Likewise, a signal path from the mobile signal source 022 to the sensor 002 is different from the signal path from the fixed signal source 021 to the sensor 002. Therefore, the shape of a cross spectrum calculated by the feature value calculation unit 003 also differs between the value calculated based on the signal received from the fixed signal source 021 and the value calculated based on the signal received from the mobile signal source 022.

The feature value calculation unit 003 can perform the norm normalization when calculating a cross spectrum. By performing the norm normalization, the feature value calculation unit 003 can remove the dependence on the signal size.

The feature value store 004 is a storage device such as a memory or a disk device. In the feature value store 004, a feature value calculated by the feature value calculation unit 003 is recorded. Moreover, in the feature value store 004, a label output by the teacher label generation unit 005 to be described later and the corresponding feature value are recorded so as to be linked to each other. In other words, in the feature value store 004, the feature value calculated by the feature value calculation unit 003 and the label of the feature value generated by the teacher label generation unit 005 are associated and recorded as a set.

The teacher label generation unit 005 generates a label indicating whether or not there is an output by the fixed signal source 021 at the time corresponding to a feature value. Generation of a label by the teacher label generation unit 005 may be manually performed, or may be automatically performed. In this example embodiment, the teacher label generation unit 005 generates a label in response to a manual input, for example.

The fixed signal source output range determination unit 006 determines identification range information indicating an identification range for identifying a signal output by the fixed signal source 021 from the set of feature value and label recorded in the feature value store 004.

For example, the fixed signal source output range determination unit 006, with the set of feature value and label recorded in the feature value store 004 as an input, maps the elements of the set in a feature value space. FIG. 5 is a two-dimensional schematic view expressing how the elements are mapped. Then, the fixed signal source output range determination unit 006 learns a discriminator and determines an identification range as shown by a dotted line in FIG. 6. The fixed signal source output range determination unit 006 determines an identification range, for example, so that an element (a feature value) corresponding to a label indicating that there is an output by the fixed signal source 021 falls within the identification range and meanwhile an element (a feature value) corresponding to a label showing that there is an output by a source other than the fixed signal source 021 does not fall within the identification range. In the case showing in FIG. 6, a range indicated by diagonal hatching surrounded by the dotted line is an identification range that is a range for identifying as a signal output by the fixed signal source 021. As the discriminator, a general discriminator can be used such as GMM (Gaussian Mixture Model), DNN (Deep Neural Network), or SVM (support vector machine). For example, the fixed signal source output range determination unit 006 uses SVM as the discriminator.

The number of identification ranges determined by the fixed signal source output range determination unit 006 is not limited to one. The fixed signal source output range determination unit 006 may determine one identification range, or may determine a plurality of identification ranges.

In the discrimination range DB007, the identification range determined by the fixed signal source output range determination unit 006 is recorded. As mentioned above, the number of identification ranges determined by the fixed signal source output range determination unit 006 is not limited to one. In the discrimination range DB 007, a number of identification ranges depending on the determination by the fixed signal source output range determination unit 006 are recorded.

The above is an example of the components included by the learning unit.

Of the components included by the fixed signal source identification device 000, the sensor 001, the sensor 002, the feature value calculation unit 003, the discrimination range DB 007, and the fixed signal source output signal identification unit 008 configure an identification unit. The identification unit identifies whether or not a received output is an output by the fixed signal source 021 by using the identification range determined by the learning unit. Of the components included by the fixed signal source identification device 000, the components included by the identification unit will be described below.

The configurations of the sensor 001, the sensor 002, the feature value calculation unit 003, and the discrimination range DB 007 have already been described in connection with the learning unit. Therefore, the detailed description thereof will be omitted.

The fixed signal source output signal identification unit 008 identifies whether or not a signal corresponding to a feature value calculated by the feature value calculation unit 003 is a signal output by the fixed signal source 021 by using the identification range recorded in the discrimination range DB 007. Then, the fixed signal source output signal identification unit 008 outputs an identification result that is the result of the identification. For example, output by the fixed signal source output signal identification unit 008 may be transmission to an external device, or may be display of the identification result to a display device. The fixed signal source output signal identification unit 008 may output by a method other than illustrated above For example, the fixed signal source output signal identification unit 008 verifies whether or not a feature value calculated by the feature value calculation unit 003 falls within the identification range stored in the discrimination range DB 007. For example, it is assumed that in the example shown in FIG. 7, a feature value indicated by black triangle mark ▲ in the feature value space is input. The feature value indicated by black triable mark ▲ falls within the identification range as shown in FIG. 7. Therefore, the fixed signal source output signal identification unit 008 identifies the signal corresponding to the feature value as a fixed signal source output signal. That is, the result of identification at the corresponding time by the fixed signal source output signal identification unit 008 is that the signal is a fixed signal source output signal. Moreover, for example, it is assumed that in the example shown in FIG. 7, a feature value indicated by black square mark ■ in the feature value space is input. As shown in FIG. 7, the feature value indicated by black square mark ■ does not fall within the identification range. Therefore, the fixed signal source output signal identification unit 008 identifies that the signal corresponding to the feature value is not a fixed signal source output signal. That is, the result of identification at the corresponding time by the fixed signal source output signal identification unit 008 is that the signal is not a fixed signal source output signal.

The above is an example of the components included by the identification unit.

The fixed signal source identification device 000 has the components corresponding to the learning unit and the identification unit described above. The fixed signal source identification device 000 uses the identification range learned by the learning unit and performs signal identification by the identification unit. The fixed signal source identification device 000 may be configured by one information processing device, or may be configured by a plurality of information processing devices. The fixed signal source identification device 000 may be configured by two devices, that is, a device having a configuration corresponding to the learning unit and a device having a configuration corresponding to the identification unit, for example.

Next, with reference to FIGS. 8 and 9, an example of the operation of the fixed signal source identification device 000 will be described. First, with reference to FIG. 8, an example of the operation of the components corresponding to the learning unit of the fixed signal source identification device 000 will be described. Learning by the learning unit is performed in prior to identification by the identification unit, for example.

Referring to FIG. 8, the feature value calculation unit 003 calculates a feature value based on signals received by the sensors 001 and 002 (step S101). For example, the feature value calculation unit 003 calculates the cross spectrum of the sensor 001 and the sensor 002 as a feature value. The feature value calculation unit 003 may perform the norm normalization when calculating the cross spectrum.

The feature value store 004 associates the feature value calculated by the feature value calculation unit 003 with a label of the feature value generated by the teacher label generation unit 005 and records as a set therein (step S102). Generation of the label by the teacher label generation unit 005 is performed manually, for example.

The fixed signal source output range determination unit 006, with the set of feature value and label recorded in the feature value store 004 as an input, maps the elements of the set in a feature value space. Then, the fixed signal source output range determination unit 006 learns a discriminator, and determines an identification range as shown by the dotted line in FIG. 6 (step S103).

In the discrimination range DB 007, the identification range determined by the fixed signal source output range determination unit 006 is recorded (step S104). The number of identification ranges recorded in the discrimination range DB 007 is not limited to one, and may be plural.

The above is an example of the operation of the components corresponding to the learning unit of the fixed signal source identification device 000. Next, with reference to FIG. 9, an example of the operation of the components corresponding to the identification unit of the fixed signal source identification device 000 will be described. In the example shown in FIG. 9, it is assumed that the identification range as a result of previously learning by the learning unit is stored in the discrimination range DB 007.

Referring to FIG. 9, the feature value calculation unit 003 calculates a feature value based on signals received by the sensors 001 and 002 (step S201). For example, the feature value calculation unit 003 calculates the cross spectrum of the sensor 001 and the sensor 002 as a feature value. The feature value calculation unit 003 may perform the norm normalization when calculating the cross spectrum.

The fixed signal source output signal identification unit 008 verifies whether or not the feature value calculated by the feature value calculation unit 003 falls within the identification rage stored in the identification rage DB 007 (step S202).

When the feature value calculated by the feature value calculation unit 003 falls within the identification range stored in the discrimination range DB 007 (step S202, Yes), the fixed signal source output signal identification unit 008 identifies the signal corresponding to the feature value as a fixed signal source output signal (step S203). On the other hand, when the feature value calculated by the feature value calculation unit 003 does not fall within the identification range stored in the discrimination range DB 007 (step S202, No), the fixed signal source output signal identification unit 008 identifies the signal corresponding to the feature value as not a fixed signal source output signal (step S204).

The fixed signal source output signal identification unit 008 outputs an identification result that is the result of the identification (step S205). For example, the fixed signal source output signal identification unit 008 outputs a time-series identification result.

Thus, the fixed signal source identification device 000 in this example embodiment has the learning unit including the fixed signal source output range determination unit 006, and the identification unit. With such a configuration, the fixed signal source output range determination unit 006 of the learning unit can determine an identification range used for discriminating a signal output by the fixed signal source 021. Then, the identification unit can identify whether or not a received signal is a signal output by the fixed signal source 021 by using the determined identification range. That is, the fixed signal source identification device 000 in this example embodiment can use a plurality of sensors (the sensor 001 and the sensor 002) and learn an identification range dependent on the difference of signal transmission paths. With this, it becomes possible to stably detect whether or not a received signal is a signal output by the fixed signal source 021 without depending on signal frequency characteristic. In other words, it becomes possible to easily detect that a received signal is a signal output by the fixed signal source 021 that is a previously fixed signal source. Specifically, the fixed signal source identification device 000 in this exemplary embodiment can calculate the identification range by general operation without requiring special in-space calibration. Therefore, the installation cost can be reduced.

In this example embodiment, the learning process (determination of the identification range) by the learning unit is performed in prior to the identification process by the identification unit. More specifically, the learning unit performs learning in advance, and the learning by the learning unit may be performed at any time as far as not later than the time point of identification by the fixed signal source output signal identification unit 008. In other words, it is required that the identification range has already been stored in the discrimination range DB 007 when the fixed signal source output signal identification unit 008 performs identification. Therefore, it is also possible to operate to, while running the learning unit and the identification unit simultaneously at all times, perform learning on a time range L that is past than the present time (for example, the time point of identification by the fixed signal source output signal identification unit 008) and continue updating the discrimination range DB007 at all times.

The time range L determined in advance can be, for example, one day. By making the time range L longer, the stability of detection increases. On the other hand, by making the time range L shorter, the followability to the movement of the fixed signal source 021 and a reflector that reflects a signal increases. For the same reason, instead of using all the data in the time range L, it is also possible to introduce a forgetting factor $\tau$ and weight more recent data for calculation. For example, by weighting the feature value according to time, it is possible to configure so that a more recent feature value influences more determination of the identification range.

Further, in this example embodiment, two sensors, that is, the sensor 001 and the sensor 002 are used as inputs. However, the number of the sensors included by the fixed signal source identification device 000 is not limited to two. The fixed signal source identification device 000 can include a plurality of sensors. For example, the fixed signal source identification device 000 can handle a super vector in which the respective cross-correlation functions of six combinations that can be taken by four sensors are arranged, as a feature value vector having six times the number of dimensions. In particular, by arranging the sensors three-dimensionally like a spatial sensor array, it is possible to further reduce an error dependent on the direction. The sensor specifically depends on the type of signal. The sensor is, for example, a microphone, a hydrophone, a vibration sensor, a temperature sensor, or the like.

Second Example Embodiment

Figure 10:
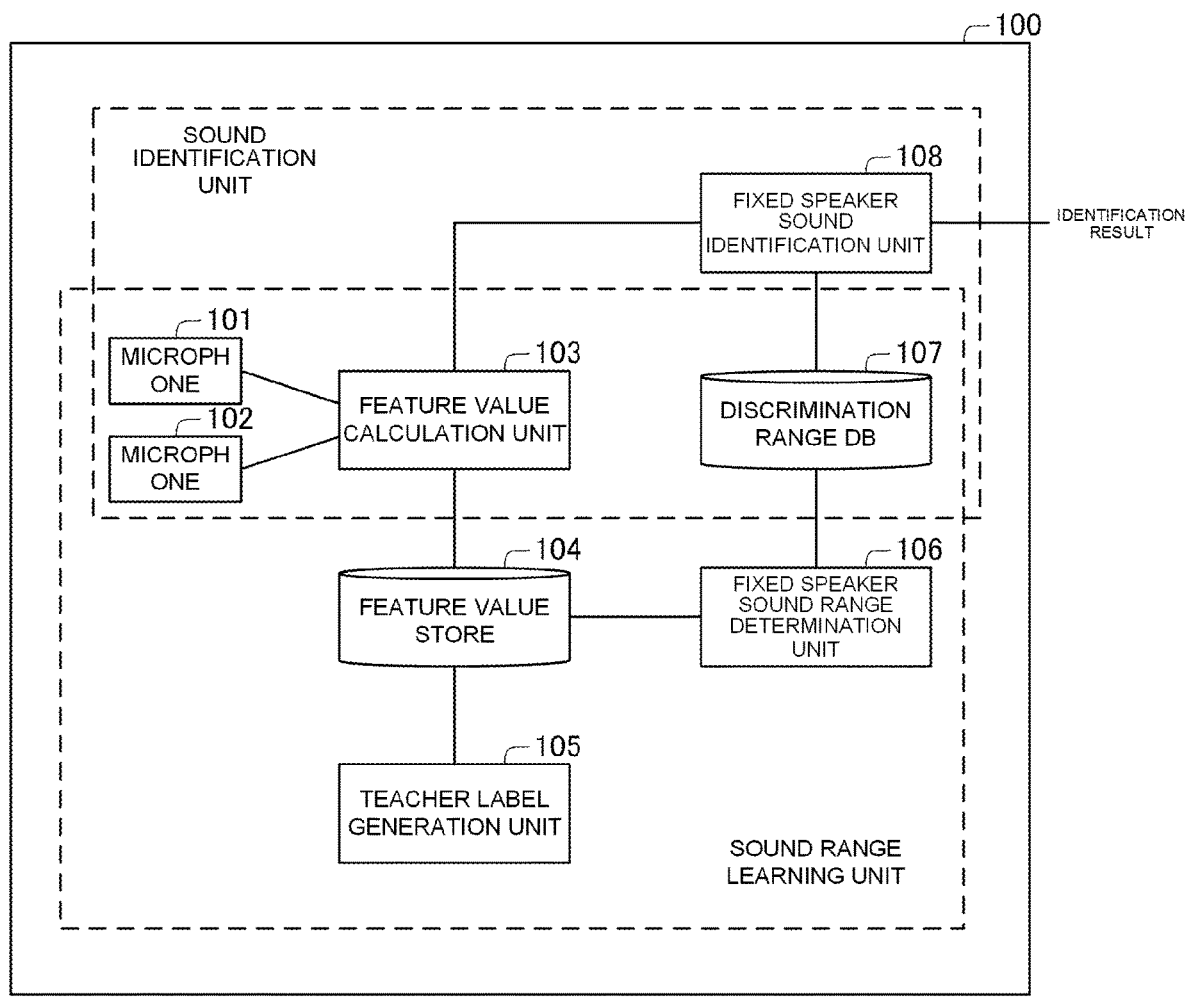
FIG. 10 is a view showing an example of the configuration of a fixed speaker identification device in a second example embodiment of the present invention.
Figure 11:
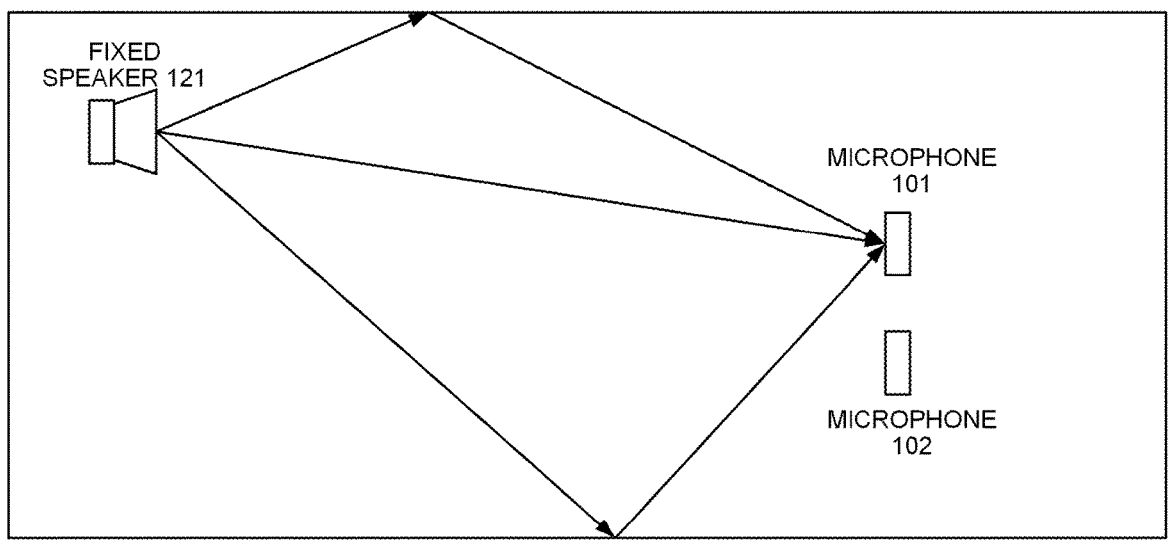
FIG. 11 is a view showing an example of the relation between a fixed speaker and a microphone.
Figure 12:
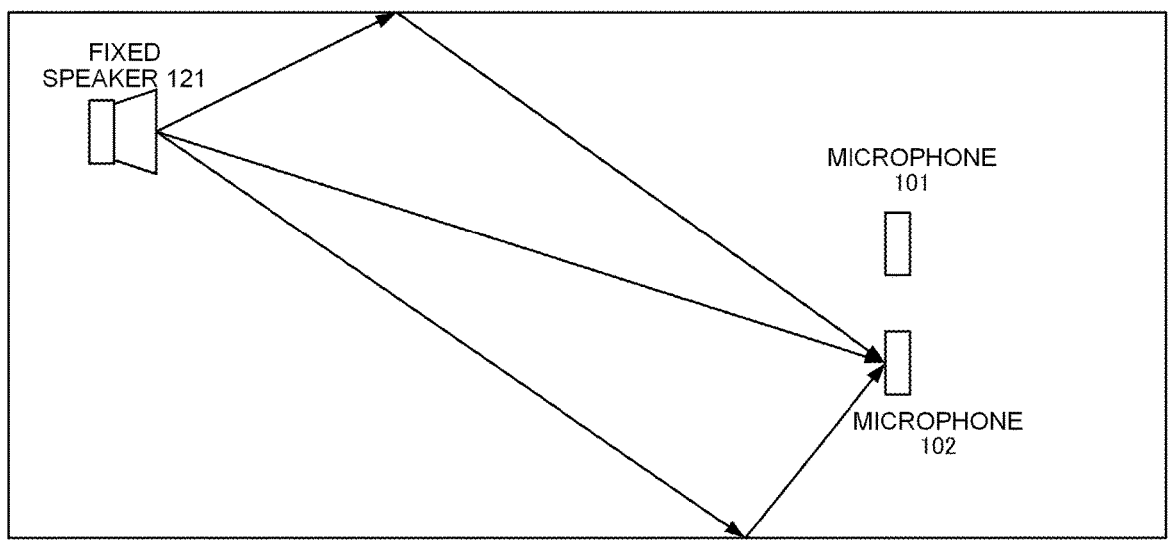
FIG. 12 is a view showing an example of the relation between the fixed speaker and another microphone.
Figure 13:
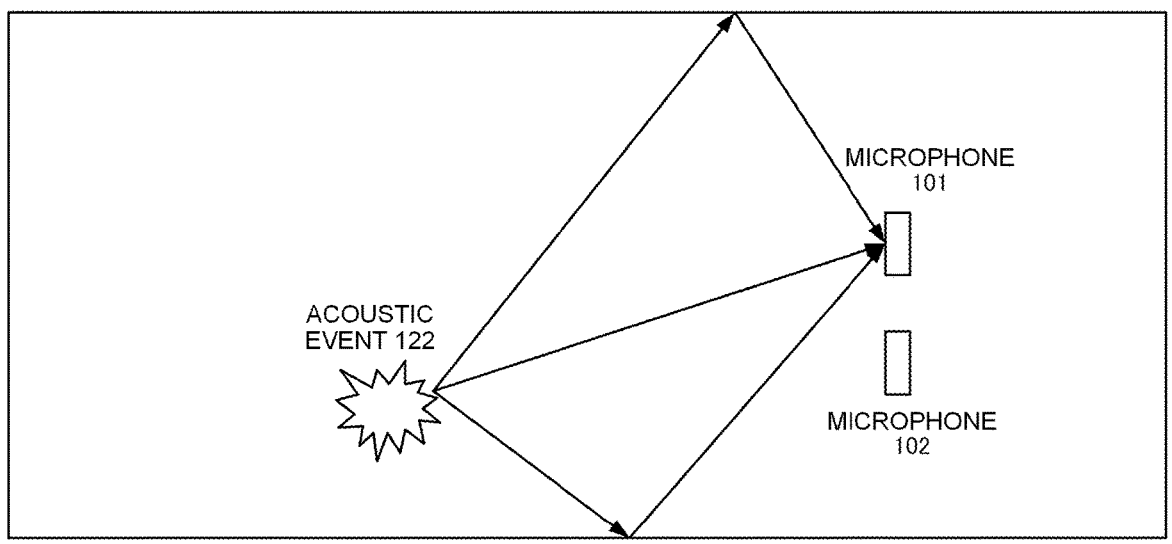
FIG. 13 is a view showing an example of the relation between an acoustic event and the microphone.
Figure 14:
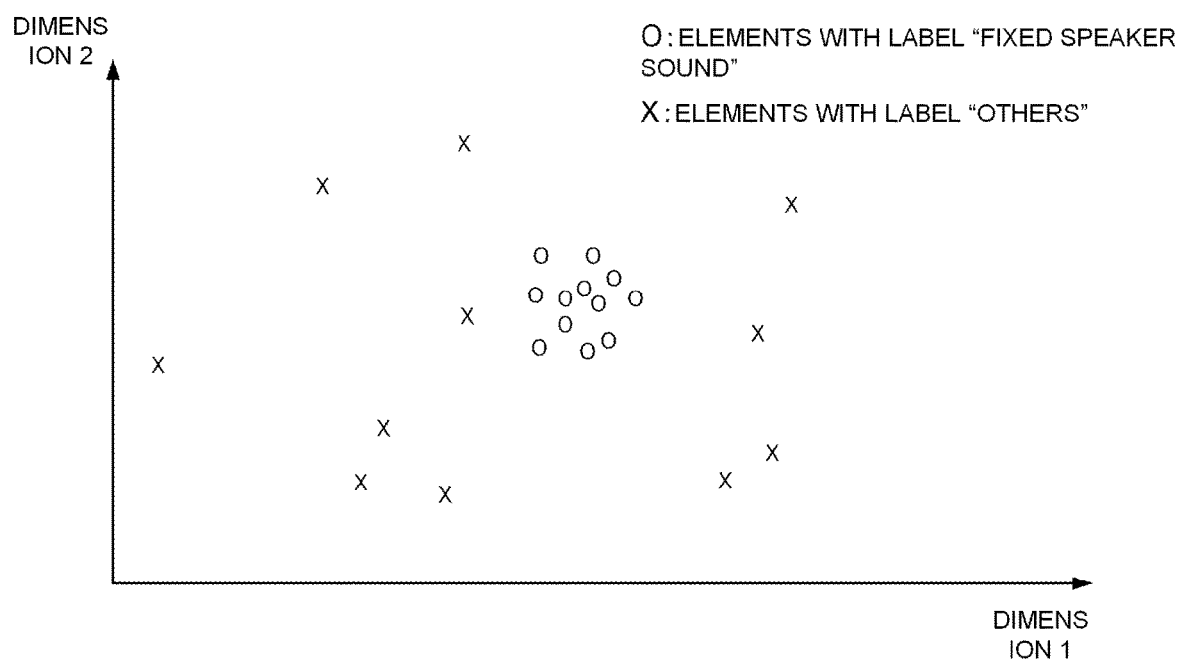
FIG. 14 is a view showing an example of the existence distribution of elements of a set recorded in a feature value store, mapped in a feature value space.
Figure 15:
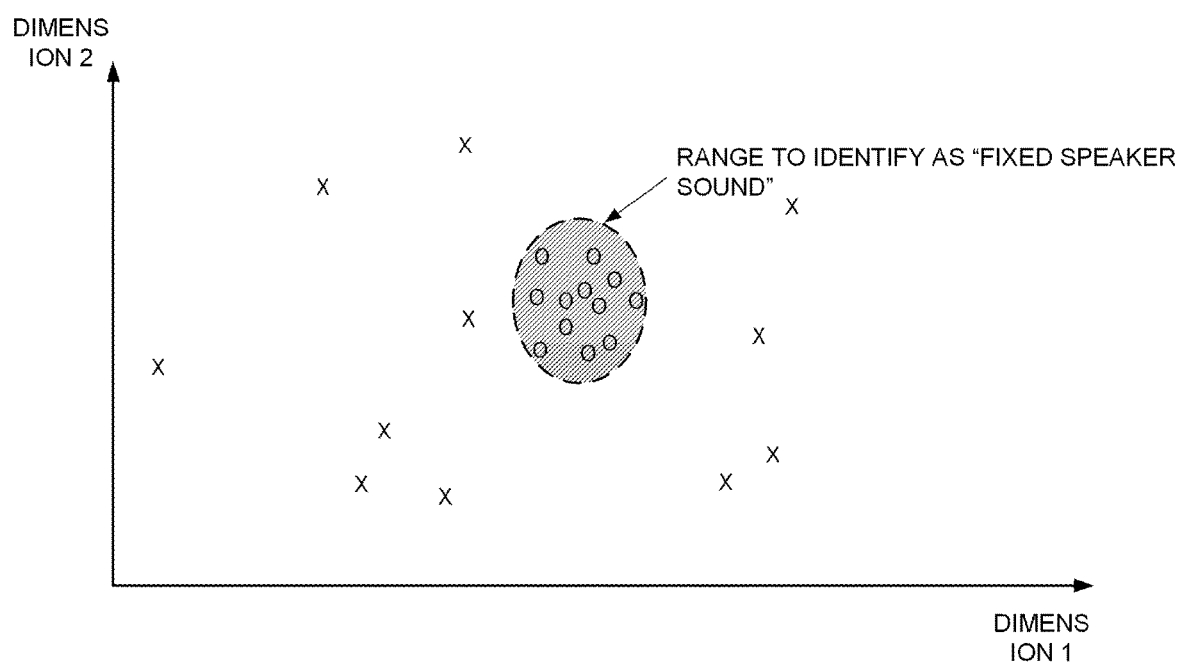
FIG. 15 is a view showing an example of an identification range determined by a fixed speaker sound range determination unit.
Figure 16:
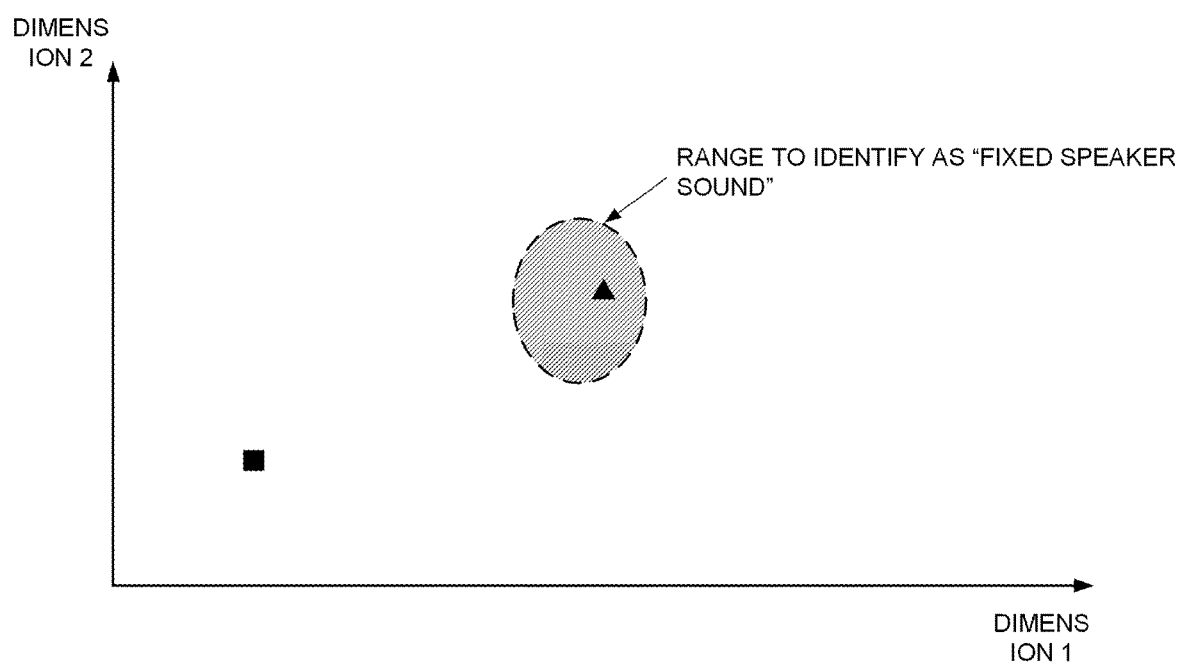
FIG. 16 is a view for describing the operation of a fixed speaker sound identification unit.
Figure 17:
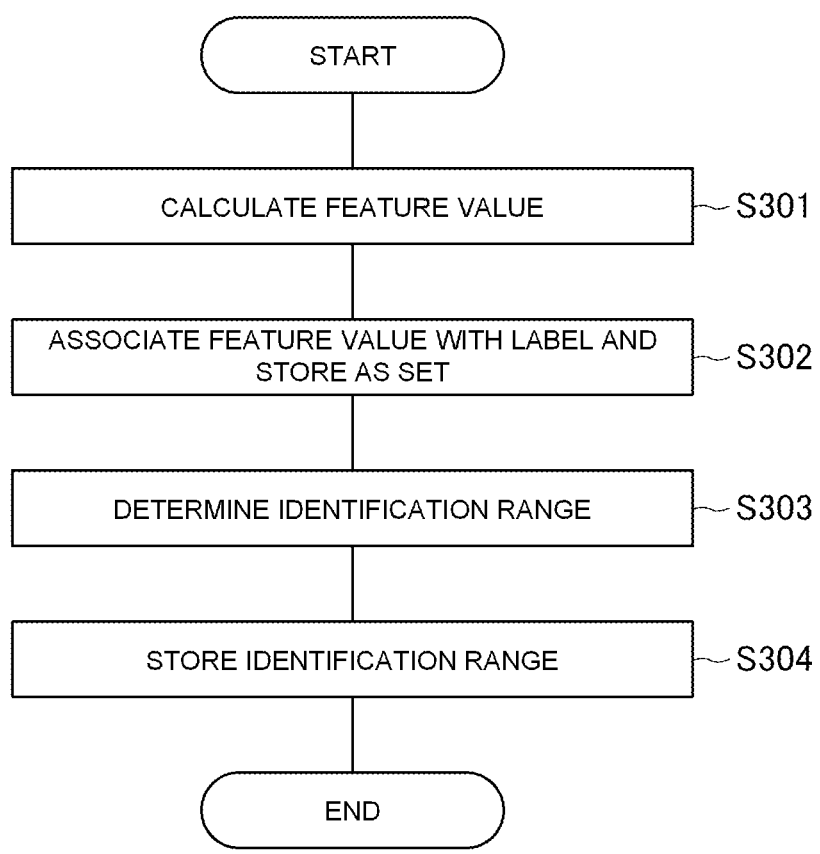
FIG. 17 is a flowchart showing an example of the operation of components corresponding to a sound range learning unit of the fixed speaker identification device.
Figure 18:
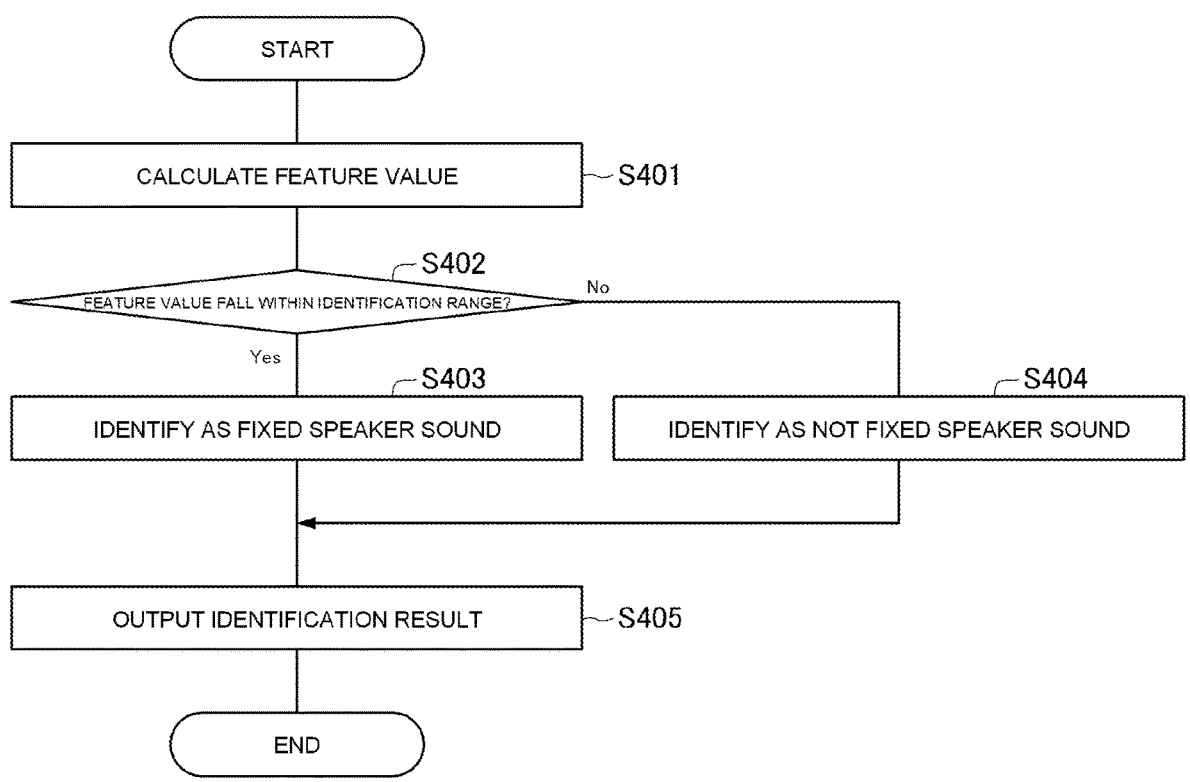
FIG. 18 is a flowchart showing an example of the operation of components corresponding to a sound identification unit of the fixed speaker identification device.

Next, a second example embodiment of the present invention will be described with reference to FIGS. 10 to 18. FIG. 10 is a view showing an example of the configuration of a fixed speaker identification device 100. FIG. 11 is a view showing an example of the relation between a fixed speaker 121 and a microphone 101. FIG. 12 is a view showing an example of the relation between the fixed speaker 121 and a microphone 101. FIG. 13 is a view showing an example of the relation between an acoustic event 122 and the microphone 101. FIG. 14 is a view showing an example of the existence distribution of elements of a set recorded in a feature value store 104, mapped in a feature value space. FIG. 15 is a view showing an example of an identification range determined by a fixed speaker sound range determination unit 106. FIG. 16 is a view for describing the operation of a fixed speaker sound identification unit 108. FIG. 17 is a flowchart showing an example of the operation of components corresponding to a sound range learning unit of the fixed speaker identification device 100. FIG. 18 is a flowchart showing an example of the operation of components corresponding to a sound identification unit of the fixed speaker identification device 100.

In the second example embodiment, the fixed speaker identification device 100 that identifies whether or not a received acoustic signal is an acoustic signal from the fixed speaker 121. That is, in this example embodiment, an example of a case where the fixed signal source identification device 000 described in the first example embodiment is specifically applied to acoustic signals will be described.

The fixed speaker identification device 100 is an information processing device which identifies whether or not a received acoustic signal is an acoustic signal from the fixed speaker 121. The fixed speaker identification device 100 receives an acoustic signal from the fixed speaker 121 whose installation position is fixed, and also receives an acoustic signal from the acoustic event 122 other than the fixed speaker 121. Then, the fixed speaker identification device 100 identifies whether or not the received signal is an acoustic signal from the fixed speaker 121.

FIG. 10 shows an example of the configuration of the fixed speaker identification device 100. Referring to FIG. 10, the fixed speaker identification device 100 includes the microphone 101, the microphone 102, a feature value calculation unit 103, the feature value store 104, a teacher label generation unit 105, the fixed speaker sound range determination unit 106, a discrimination range DB 107, and the fixed speaker sound identification unit 108.

The fixed speaker identification device 100 includes, for example, an arithmetic device such as a CPU that is not shown in the drawing and a storage device. For example, the fixed speaker identification device 100 realizes the above-mentioned respective processing units by execution of a program stored in a storage device that is not shown in the drawing by the arithmetic device.

Of the components included by the fixed speaker identification device 100, the microphone 101, the microphone 102, the feature value calculation unit 103, the feature value store 104, the teacher label generation unit 105, the fixed speaker sound range determination unit 106, and the discrimination range DB 107 configure a sound range learning unit. The sound range learning unit determines the range of a fixed speaker sound that is a signal output by the fixed speaker 121 (an identification range). First, of the components included by the fixed speaker identification device 100, the components included by the sound range learning unit will be described below.

The microphone 101 and the microphone 102 are sensors which are fixed with a certain interval in the fixed speaker identification device 100 or around the fixed speaker identification device 100. The microphones 101 and 102 convert amplitude information of received sounds into signals, respectively. In this example embodiment, the microphones 101 and 102 include a function to perform A/D conversion, and the outputs can be handled as digital time-series signals.

The microphone 101 and the microphone 102 are fixed with a certain interval as mentioned above. Therefore, for example, a path in which an acoustic signal output by the fixed speaker 121 reaches the microphone 101 is different from a path in which a signal output by the fixed speaker 121 reaches the microphone 102.

FIGS. 11 and 12 show examples of acoustic signal paths. To be specific, FIG. 11 shows an example of the relation between the fixed speaker 121 and the microphone 101, and FIG. 12 shows an example of the relation between the fixed speaker 121 and the microphone 102. Referring to FIG. 11, a signal output by the fixed speaker 121 may reach the microphone 101 through a plurality of paths. Therefore, a signal of a sound which can be observed by the microphone 101 can be expressed as a signal obtained by convolving the acoustic signal output by the fixed speaker 121 with a transfer function dependent on a path. Transmission of an acoustic signal includes diffraction, refraction, diffuse reflection, and so on, and they can also be expressed as combination of paths. Moreover, as shown in FIG. 12, it is true for the microphone 102. As mentioned above, the microphone 101 and the microphone 102 are installed with a certain interval. Therefore, as shown in FIGS. 11 and 12, there is a difference according to the installation positions between the acoustic signal path from the fixed speaker 121 to the microphone 101 and the acoustic signal path from the fixed speaker 121 to the microphone 102.

The feature value calculation unit 103 calculates a feature value that expresses a spatial path required for sound arrival every predetermined time period based on an acoustic signal received by the microphone 101, 102.

For example, the feature value calculation unit 103 calculates the cross spectrum of the microphone 101 and the microphone 102. The feature value calculation unit 103 calculates the cross spectrum, for example, by the same method as the feature value calculation unit 003 described in the first example embodiment. As in the first exemplary embodiment, the degree of similarity, that is, the difference in transfer functions between the path from the fixed speaker 121 to the microphone 101 and the path from the fixed speaker 21 to the microphone 102 is in the form of a cross spectrum.

In a case where the acoustic event 122 that is different from the fixed speaker 121 sounds, as shown in FIG. 13, an acoustic signal reaches the microphone 101 and the microphone 102 through paths which are different at all from those in the case of FIGS. 11 and 12. Therefore, the shape of the cross spectrum is also different. This is also the same as in the first example embodiment.

The feature value calculation unit 103 can perform the norm normalization when calculating the cross spectrum in the same manner as the feature value calculation unit 003 described in the first example embodiment. By performing the norm normalization, the feature value calculation unit 103 can remove the dependence on the magnitude of sound.

The feature value store 104 is a storage device such as a memory or a disk device. In the feature value store 104, a feature value calculated by the feature value calculation unit 103 is recorded. Moreover, in the feature value store 104, a label output by the teacher label generation unit 105 to be described later and the corresponding feature value are recorded so as to be liked to each other. In other words, in the feature value store 104, a feature value calculated by the feature value calculation unit 103 and a label of the feature value generated by the teacher label generation unit 105 are associated and recorded as a set.

The teacher label generation unit 105 generates a label indicating whether or not there is a sound from the fixed speaker 121 at the time corresponding to the feature value. Generation of a label by the teacher label generation unit 105 may be manually performed, or may be automatically performed. In this example embodiment, the teacher label generation unit 105 generates a label in response to a manual input, for example.

The fixed speaker sound range determination unit 106 determines identification range information indicating an identification range for discriminating a signal output by the fixed speaker 121 from the set of feature value and label recorded in the feature value store 104.

For example, the fixed speaker sound range determination unit 106, with the set of feature value and label recorded in the feature value store 104 as an input, maps the elements of the set in a feature value space. FIG. 14 is a two-dimensional schematic representation of how the elements are mapped. Then, the fixed speaker sound range determination unit 106 learns a discriminator and determines an identification range as shown by a dotted line in FIG. 15. The fixed speaker sound range determination unit 106 determines an identification range, for example, so that an element (a feature value) corresponding to a label indicating that there is an output by the fixed speaker 121 falls within the identification range and meanwhile an element (a feature value) corresponding to a label indicating that there is an output by a source other than the fixed speaker 121 does not fall within the identification range. In the case shown in FIG. 15, a range indicated by diagonal hatching surrounded by the dotted line is an identification range that is a range for identifying as a signal output by the fixed speaker 121. In this example embodiment, SVM is used as the discriminator. However, the fixed speaker sound range determination unit 106 may use another discriminator shown in the first example embodiment.

In the same manner as the fixed signal source output range determination unit 006 described in the first example embodiment, the fixed speaker sound range determination unit 106 may determine one identification range, or may determine a plurality of identification ranges.

In the discrimination range DB 107, an identification range determined by the fixed speaker sound range determination unit 106 is recorded. The number of identification ranges recorded in the discrimination range DB 107 may be one, or may be plural.

The above is an example of the components included by the sound range learning unit.

Further, of the components included by the fixed speaker identification device 100, the microphone 101, the microphone 102, the feature value calculation unit 103, the discrimination range DB 107, and the fixed speaker sound identification unit 108 configure a sound identification unit. The sound identification unit identifies whether or not a received acoustic signal is an output by the fixed speaker 121 by using the identification range determined by the sound range learning unit. Of the components included by the fixed speaker identification device 100, the components included by the sound identification unit will be described below.

The configurations of the microphone 101, the microphone 102, the feature value calculation unit 103 and the discrimination range DB 107 have already been described in connection with the sound range learning unit mentioned above. Therefore, the detailed description thereof will be omitted.

The fixed speaker sound identification unit 108 identifies whether or not an acoustic signal corresponding to a feature value calculated by the feature value calculation unit 103 is a sound from the fixed speaker 121 by using the identification range recorded in the discrimination range DB 107. Then, the fixed speaker sound identification unit 108 outputs an identification result that is the result of the identification. For example, the output by the fixed speaker sound identification unit 108 may be transmission to an external device, or may be display of the identification result to the display device. The fixed speaker sound identification unit 108 may output by a method other than illustrated above For example, the fixed speaker sound identification unit 108 verifies whether or not a feature value calculated by the feature value calculation unit 103 falls within the identification range stored in the discrimination range DB 107. For example, it is assumed that in the example shown in FIG. 16, a feature value indicated by black triangle mark ▲ in the feature value space is input. The feature value indicated by black triangle mark ▲ falls within the identification range as shown in FIG. 16. Therefore, the fixed speaker sound identification unit 108 identifies a signal corresponding to the feature value as a fixed signal source output signal. That is, the result of identification at the corresponding time by the fixed speaker sound identification unit 108 is that the signal is a fixed speaker sound. Moreover, for example, it is assumed that in the example shown in FIG. 16, a feature value indicated by black square mark ■ in the feature value space is input. As shown in FIG. 16, the feature value indicated by black square mark ■ does not fall within the identification range. Therefore, the fixed speaker sound identification unit 108 identifies that a signal corresponding to the feature value is not a fixed signal source output signal. That is, the result of identification at the corresponding time by the fixed speaker sound identification unit 108 is that the signal is not a fixed speaker sound.

The above is an example of the components included by the sound identification unit.

The fixed speaker identification device 100 has the components corresponding to the sound range learning unit and the sound identification unit described above. The fixed speaker identification device 100 uses the identification range learned by the sound range learning unit and performs acoustic signal identification by the sound identification unit. The fixed speaker identification device 100 may be configured by one information processing device, or may be configured by a plurality of information processing devices. The fixed speaker identification device 100 may be configured by two devices, that is, a device having a configuration corresponding to the sound range learning unit and a device having a configuration corresponding to the sound identification unit, for example.

Next, with reference to FIG. 17 and FIG. 18, an example of the operation of the fixed speaker identification device 100 will be described. First, with reference to FIG. 17, an example of the operation of the components corresponding to the sound range learning unit of the fixed speaker identification device 100 will be described. Learning by the sound range learning unit is performed in prior to identification by the identification unit, for example.

Referring to FIG. 17, the feature value calculation unit 103 calculates a feature value based on acoustic signals received by the microphones 101 and 102 (step S301). For example, the feature value calculation unit 103 calculates the cross spectrum of the microphone 101 and the microphone 102 as a feature value. The feature value calculation unit 103 may perform the norm normalization when calculating the cross spectrum.

The feature value store 104 associates a feature value calculated by the feature value calculation unit 103 with a label of the feature value generated by the teacher label generation unit 105, and records as a set therein (step S302). Generation of a label by the teacher label generation unit 105 is performed manually, for example.

The fixed speaker sound range determination unit 106, with the set of feature value and label recorded in the feature value store 104 as an input, maps the elements of the set in a feature value space. Then, the fixed speaker sound range determination unit 106 learns a discriminator, and determines an identification range as shown by the dotted line in FIG. 15 (step S303).

In the discrimination range DB 107, the identification range determined by the fixed speaker sound range determination unit 106 is recorded (step S304). In the discrimination range DB 107, not only one identification range but a plurality of identification ranges may be recorded.

The above is an example of the operation of the components corresponding to the sound range learning unit of the fixed speaker identification device 100. Next, with reference to FIG. 18, an example of the operation of the components corresponding to the sound identification unit of the fixed speaker identification device 100 will be described. It is assumed that the identification range as a result of previously learning by the learning unit is stored in the discrimination range DB 107.

Referring to FIG. 18, the feature value calculation unit 103 calculates a feature value based on signals received by the microphones 101 and 102 (step S401). For example, the feature value calculation unit 103 calculates the cross spectrum of the microphone 101 and the microphone 102 as a feature value. The feature value calculation unit 103 may perform the norm normalization when calculating the cross spectrum.

The fixed speaker sound identification unit 108 verifies whether or not the feature value calculated by the feature value calculation unit 103 falls within the identification range stored in the discrimination range DB 107 (step S402).

When the feature value calculated by the feature value calculation unit 103 falls within the identification range stored in the discrimination range DB 107 (step S402, Yes), the fixed speaker sound identification unit 108 identifies the acoustic signal corresponding to the feature value as a sound from the fixed speaker (step S403). On the other hand, when the feature value calculated by the feature value calculation unit 103 does not fall within the identification range stored in the discrimination range DB 107 (step S402, No), the fixed speaker sound identification unit 108 identifies the acoustic signal corresponding to the feature value as not a sound from the fixed speaker (step S404).

The fixed speaker sound identification unit 108 outputs an identification result that is the result of the identification (step S405). For example, the fixed speaker sound identification unit 108 outputs a time-series identification result.

Thus, the fixed speaker identification device 100 in this example embodiment has the sound range learning unit including the fixed speaker sound range determination unit 106, and the sound identification unit. With such a configuration, the fixed speaker sound range determination unit 106 of the sound range learning unit can determine an identification range used in identifying an acoustic signal output from the fixed speaker 121. Then, the sound identification unit can identify whether or not a received signal is a signal output by the fixed speaker 121 by using the determined identification range. That is, the fixed speaker identification device 100 in this example embodiment can use a plurality of microphones (the microphone 101 and the microphone 102) and learn an identification range that is dependent on the difference of signal transmission paths. With this, it becomes possible to stably detect whether or not a received signal is a signal output by the fixed speaker 121 without depending on signal frequency characteristics. Specifically, the fixed speaker identification device 100 in this exemplary embodiment can calculate the identification range by normal operation without requiring special in-space calibration. Therefore, the installation cost can be reduced.

In this example embodiment, the learning process (determination of an identification range) by the sound range learning unit is performed in prior to the identification process by the sound identification unit. To be more specific, the sound range learning unit performs learning in advance, and the learning by the sound range learning unit may be performed at any time as far as not later than the time point of the identification by the fixed speaker sound identification unit 108. In other words, it is required that the identification range has already been stored in the discrimination range DB 107 when the fixed speaker sound identification unit 108 performs identification. Therefore, it is also possible to operate to, while running the sound range learning unit simultaneously at all times, perform learning on the time range L that is past than the present time (for example, the time point of the identification by the fixed speaker sound identification unit 108) and continue updating the discrimination range DB 107 at all times.

The time range L determined in advance can be, for example, one day. By making the time range L longer, the stability of detection increases. On the other hand, by making the time range L shorter, the followability to the movement of the fixed speaker 121 and a reflector increases. For the same reason, instead of using all the data in the time range L, it is also possible to introduce a forgetting factor τ and weight more recent data for calculation.

Further, in this example embodiment, two microphones, that is, the microphone 101 and the microphone 102 are used as inputs. However, the number of the microphones included by the fixed speaker identification device 100 is not limited to two. The fixed speaker identification device 100 may have a plurality of microphones. For example, the fixed speaker identification device 100 can handle a super vector in which the respective cross-correlation functions of six combinations that can be taken by four sensors are arranged, as a feature value vector having six times the number of dimensions. Specifically, by arranging the microphones three-dimensionally like a spatial microphone array, it is possible to further reduce an error dependent on direction. In this example embodiment, a microphone is used as a sensor to be an input. Meanwhile, it is also possible to extend by the same means to, for example, a hydrophone, a vibration sensor, a temperature sensor, and so on.

Third Example Embodiment

Figure 19:
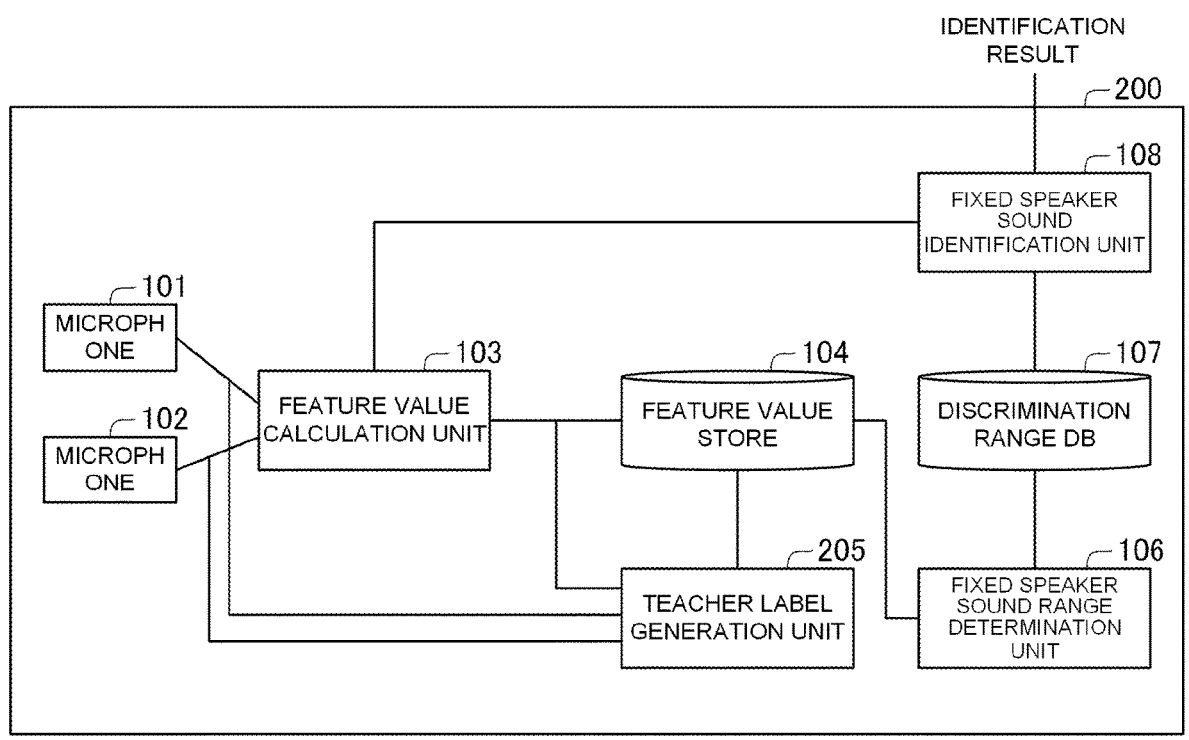
FIG. 19 is a view showing an example of the configuration of a fixed speaker identification device in a third example embodiment of the present invention.

Next, a third example embodiment of the present invention will be described with reference to FIG. 19. FIG. 19 is a view showing an example of the configuration of a fixed speaker identification device 200.

In the third example embodiment, the fixed speaker identification device 200, which is a modified example of the fixed speaker identification device 100 described in the second example embodiment, will be described. The fixed speaker identification device 200 is changed from the fixed speaker identification device 100 in a portion corresponding to the sound range learning unit. Meanwhile, of the components included by the fixed speaker identification device 200, components corresponding to a sound identification unit are the same as those of the fixed speaker identification device 100.

FIG. 19 shows an example of the configuration of the fixed speaker identification device 200. Referring to FIG. 19, the fixed speaker identification device 200 includes the microphone 101, the microphone 102, the feature value calculation unit 103, the feature value store 104, a teacher label generation unit 205, the fixed speaker sound range determination unit 106, the discrimination range DB 107, and the fixed speaker sound identification unit 108. In FIG. 19, the same components as those of the fixed speaker identification device 100 are denoted by the same reference numerals.

As described above, the fixed speaker identification device 200 includes the teacher label generation unit 205 instead of the teacher label generation unit 105 included by the fixed speaker identification device 100. The teacher label generation unit 205 as a component which is characteristic to this example embodiment will be described below.

The teacher label generation unit 205 automatically generates a label based on input information. For example, in the teacher label generation unit 205, acoustic signals from the microphones 101 and 102 and a feature value calculated by the feature value calculation unit 103 are input as shown in FIG. 19. The teacher label generation unit 205 generates a label based on the input acoustic signals and feature value.

For example, the teacher label generation unit 205 calculates the power (magnitude) of acoustic signals obtained from the microphone 101 and the microphone 102. When the calculated power of the acoustic signal is higher than a previously determined threshold value A (may be any value), the teacher label generation unit 205 determines the acoustic signal as a sounded signal. Moreover, the teacher label generation unit 205 calculates the average value μ and the variance σ of feature values of sounded signals included in a previously determined time range L2. Then, the teacher label generation unit 205 assigns a label of fixed speaker sound to time (feature value) at which a feature value is included in deviation within a range of the above variance from the above average value. On the other hand, in a case where a feature value at the above time is not included in the deviation within the range of the variance from the average value, the teacher label generation unit 205 assigns a label of not fixed speaker sound. The time range L2 may be any value. The time range L2 may be the same as or different from the time range L.

Thus, the teacher label generation unit 205 extracts part of received acoustic signals based on the dimension of sound, for example. Moreover, the teacher label generation unit 205 calculates the average value μ and the variance σ of feature values calculated from the extracted acoustic signals. Then, the teacher label generation unit 205 assigns a label based on the calculated average value μ and variance σ of the feature values.

The fixed speaker identification device 200 including the teacher label generation unit 205 described above is assumed to be used, for example, in a general household where a television receiver that is the fixed speaker 121 is left on. In the case of the environment as described above, it is supposed that most of the sounding sections of acoustic signals input from the microphones 101 and 102 are sounds from the television and sounds caused by the residents or other devices are input only on rare occasions. Therefore, by configuring the teacher label generation unit 205 in the above manner, it is possible to appropriately assign a label. The above operation example is merely an example.

Thus, the teacher label generation unit 205 included by the fixed speaker identification device 200 in this example embodiment is configured so that acoustic signals from the microphones 101 and 102 and feature values calculated by the feature value calculation unit 103 are input therein. With such a configuration, the teacher label generation unit 205 can generate a label based on the input acoustic signals and feature values. Consequently, it becomes possible to assign a label indicating fixed speaker sound by using information obtained from the microphones 101 and 102 without depending on manual operation.

In this example embodiment, the teacher label generation unit 205 assigns a label based on the average value μ and the variance σ. However, a method for assigning a label by the teacher label generation unit 205 is not limited to the case illustrated above. For example, the teacher label generation unit 205 may calculate a certain range in which feature values included in the previously determined time range L2 concentrate, for example, a 95% interval, and then assign a label based on whether or not a feature value is included therein. Besides, weighting by introducing a forgetting factor τ may also be performed in this example embodiment.

Fourth Example Embodiment

Figure 20:
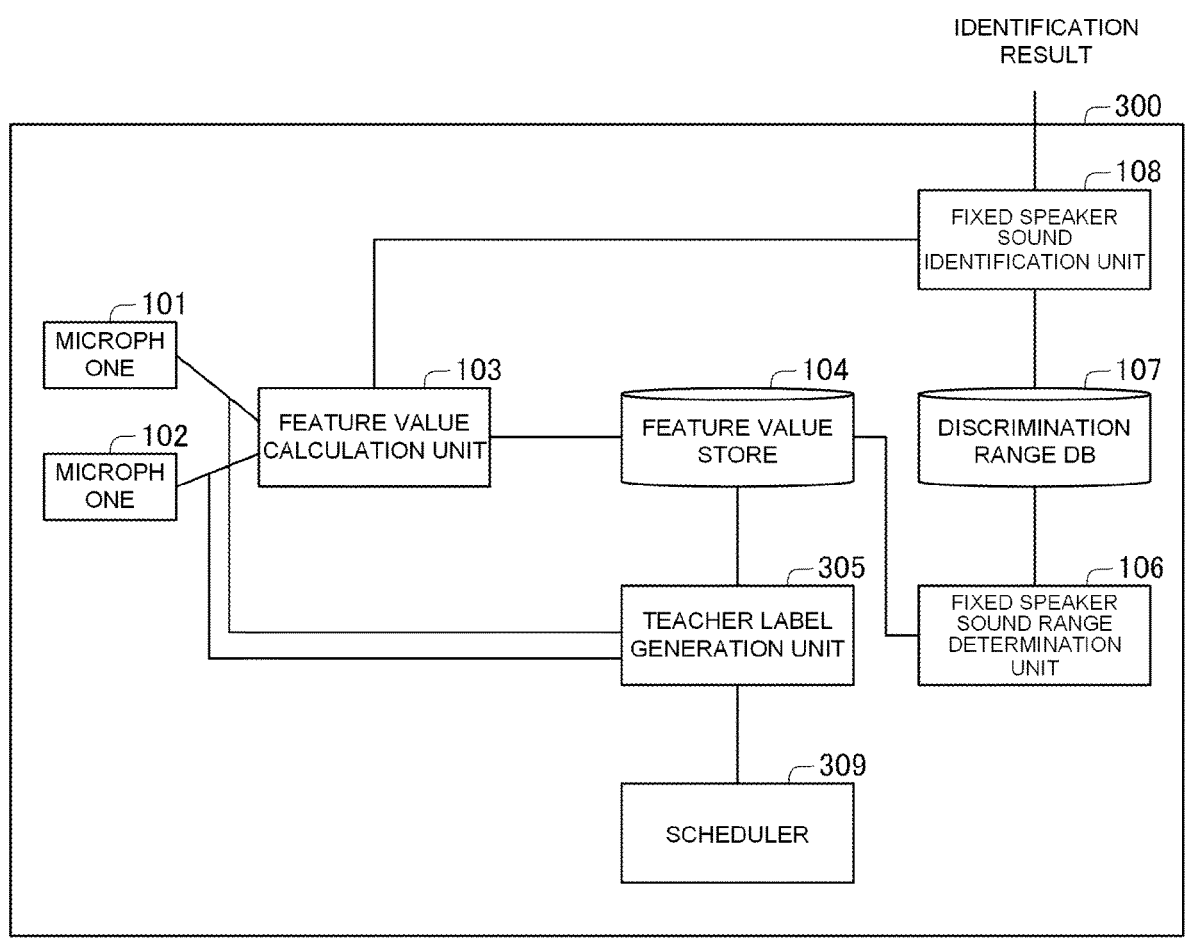
FIG. 20 is a view showing an example of the configuration of a fixed speaker identification device in a fourth example embodiment of the present invention.

Next, a fourth example embodiment of the present invention will be described with reference to FIG. 20. FIG. 20 is a view showing an example of the configuration of a fixed speaker identification device 300.

In the fourth example embodiment, the fixed speaker identification device 300, which is a modified example of the fixed speaker identification device 100 described in the second example embodiment and the fixed speaker identification device 200 described in the third example embodiment, will be described. The fixed speaker identification device 300 is changed from the fixed speaker identification device 100 and the fixed speaker identification device 200 in a portion corresponding to a sound range learning unit. Meanwhile, of the components included by the fixed speaker identification device 300, components corresponding to a sound identification unit are the same as those of the fixed speaker identification devices 100 and 200.

FIG. 20 shows an example of the configuration of the fixed speaker identification device 300. Referring to FIG. 20, the fixed speaker identification device 300 includes the microphone 101, the microphone 102, the feature value calculation unit 103, the feature value store 104, a teacher label generation unit 305, the fixed speaker sound range determination unit 106, the discrimination range DB 107, the fixed speaker sound identification unit 108, and a scheduler 309. In FIG. 20, the same components as those of the fixed speaker identification devices 100 and 200 are denoted by the same reference numerals.

As described above, the fixed speaker identification device 300 includes the teacher label generation unit 305 instead of the teacher label generation unit 105 included by the fixed speaker identification device 100 and the teacher label generation unit 205 included by the fixed speaker identification device 200. The fixed speaker identification device 300 also includes the scheduler 309. The teacher label generation unit 305 and the scheduler 309 as components that are characteristic to this example embodiment will be described below.

The scheduler 309 has a built-in clock. In the scheduler 309, a schedule indicating the use status of the fixed speaker 121 is recorded in advance. The scheduler 309 outputs information corresponding to the schedule to the teacher label generation unit 305. For example, it is assumed that according to the schedule recorded in the scheduler 309, the fixed speaker 121 performs scheduled broadcast for five minutes from 10:00 am and from 3:00 pm every day. Then, the scheduler 309 outputs to the teacher label generation unit 305 that it is time corresponding to the schedule to perform the scheduled broadcast during a time to perform the scheduled broadcast.

The teacher label generation unit 305 knows, based on the output by the scheduler 309, that it is time when a fixed speaker sound is emitted. Then, the teacher label generation unit 305 assigns a label of fixed speaker sound to a calculated feature value during the time when a fixed speaker sound is emitted. On the other hand, the teacher label generation unit 305 assigns a label of not fixed speaker sound to a calculated feature value in a case where it is not the time when a fixed speaker sound is emitted. Thus, the teacher label generation unit 305 assigns a label based on the output by the scheduler 309.

The teacher label generation unit 305 may also use together the power of acoustic signals obtained from the microphones 101 and 102 when assigning a label. For example, the teacher label generation unit 305 may be configured to perform the logical AND operation between whether or not the acoustic signal is a sounded signal determined based on the result of comparison between the power of the acoustic signal and the threshold value A, and a value corresponding to the input from the scheduler 309. In the case of performing the logical AND operation, the teacher label generation unit 305 assigns a label of fixed speaker sound when the power of the acoustic signal is a higher value than the threshold value A and it can be determined that it is the time when a fixed speaker sound is emitted based on the output by the scheduler 309, for example. On the other hand, the teacher label generation unit 305 assigns a label of not fixed speaker sound when the power of the acoustic signal is equal to or lower than the threshold value A or when it can be determined that it is the time when a fixed speaker sound is issued based on the output by the scheduler 309.

Thus, the fixed speaker identification device 300 includes the teacher label generation unit 305 and the scheduler 309. With such a configuration, the teacher label generation unit 305 can generate a label based on the schedule recorded in the scheduler 309. Consequently, in a case where the use pattern of the fixed speaker 121 is distinct, it is possible to assign a teacher label having higher accuracy. Furthermore, it is possible to increase the precision of the discrimination range DB.

Meanwhile, the fixed speaker identification device 300 may use in combination the generation of a label based on information from the scheduler 309 and the label generation methods described in the second and third example embodiments. For example, the fixed speaker identification device 300 can also be configured to assign a label based on the average value μ and variance σ of feature values in a case where it is determined that it is not the time when a fixed speaker sound is emitted based on the output by the scheduler 309.

Fifth Example Embodiment

Figure 21:
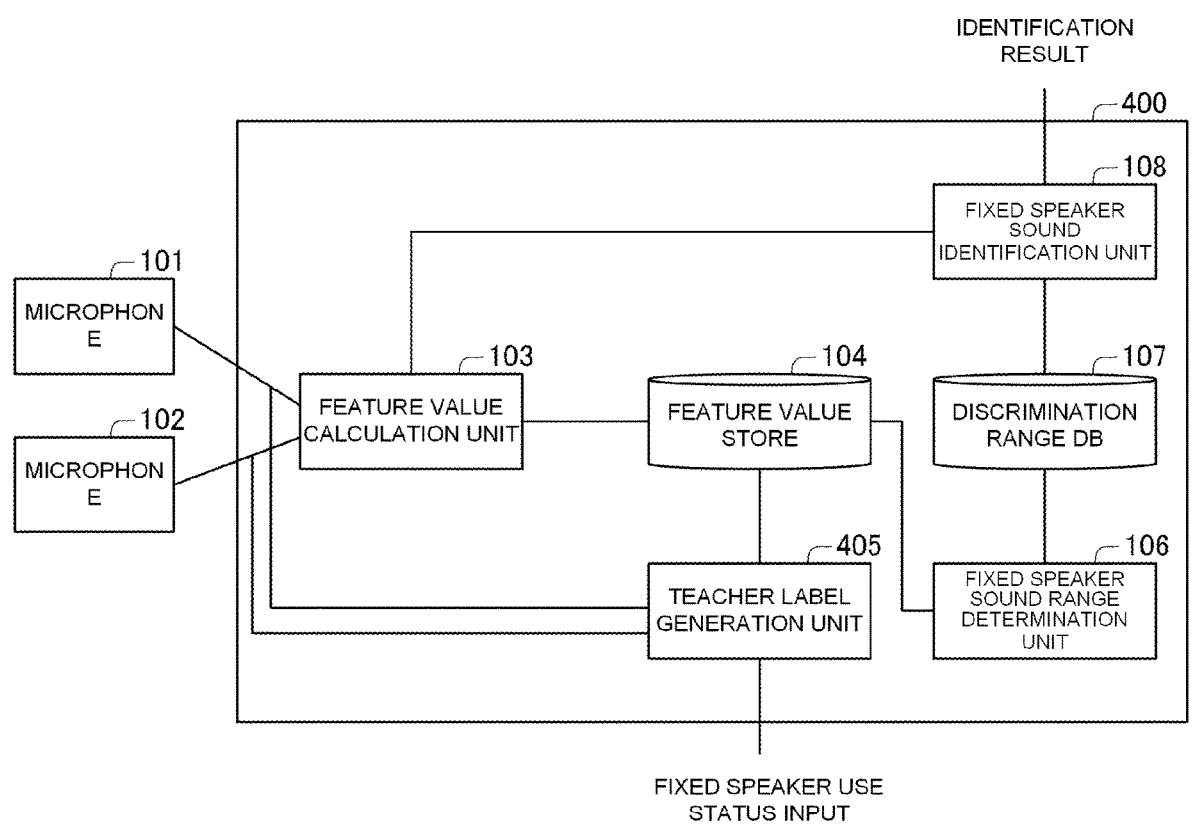
FIG. 21 is a view showing an example of the configuration of a fixed speaker identification device in a fifth example embodiment of the present invention.

Next, a fifth example embodiment of the present invention will be described with reference to FIG. 21. FIG. 21 is a view showing an example of the configuration of a fixed speaker identification device 400.

In the fifth example embodiment, the fixed speaker identification device 400, which is a modified example of the fixed speaker identification device 100 described in the second example embodiment, the fixed speaker identification device 200 described in the third example embodiment, and the fixed speaker identification device 300 described in the fourth example embodiment, will be described. The fixed speaker identification device 400 is changed from the fixed speaker identification devices 100, 200, and 300 in a portion corresponding to a sound range learning unit. Meanwhile, of the components included by the fixed speaker identification device 400, components corresponding to a sound identification unit are the same as those of the fixed speaker identification devices 100, 200, and 300.

FIG. 21 shows an example of the configuration of the fixed speaker identification device 400. Referring to FIG. 21, the fixed speaker identification device 400 includes the microphone 101, the microphone 102, the feature value calculation unit 103, the feature value store 104, a teacher label generation unit 405, the fixed speaker sound range determination unit 106, the discrimination range DB 107, and the fixed speaker sound identification unit 018. In FIG. 21, the same components as those of the fixed speaker identification devices 100, 200, and 300 are denoted by the same reference numerals.

Thus, the fixed speaker identification device 400 has the teacher label generation unit 405 instead of the teacher label generation unit 105 included by the fixed speaker identification device 100, the teacher label generation unit 205 included by the fixed speaker identification device 200, and the teacher label generation unit 305 included by the fixed speaker identification device 300. The teacher label generation unit 405 as a component that is characteristic to this example embodiment will be described below.

In the teacher label generation unit 405, a fixed speaker use status input is input from an external device or the like, for example. The teacher label generation unit 405 refers to the fixed speaker use status input having been input when generating a label.

Herein, the fixed speaker use status input is information generated by the fixed speaker 121, a device monitoring the fixed speaker device 121, or the like, in accordance with the use status of the fixed speaker 121. For example, assuming that the fixed speaker 121 is a fixed speaker in an announce broadcast station, the fixed speaker use status input is generated in conjunction with the power switch or Push to Talk switch of the broadcast station. Alternatively, for example, assuming that the fixed speaker 121 is a television receiver, the fixed speaker use status input is generated in conjunction with a power switch, the status of a mute button, a camera, a brightness sensor, or the like. Thus, the fixed speaker use status input is generated in accordance with the use status of the fixed speaker.

The teacher label generation unit 405 generates a label based on the input status of the fixed speaker use status input. For example, the teacher label generation unit 405 assigns a label of fixed speaker sound when the fixed speaker use status input is input. On the other hand, the teacher label generation unit 405 assigns a label of not fixed speaker sound when the fixed speaker use status input is not input.

As in the case described in the fourth example embodiment, the teacher label generation unit 405 may also use together the power of acoustic signals obtained from the microphones 101 and 102 when assigning a label. For example, the teacher label generation unit 405 may be configured to perform the logical AND operation between whether or not the acoustic signal is a sounded signal determined based on the result of comparison between the power of the acoustic signal and the threshold value A, and the presence/absence of the fixed speaker use status input. In the case of performing the logical AND operation, the teacher label generation unit 405 assigns a label of fixed speaker sound when the power of the acoustic signal is a higher value than the threshold value A and the fixed speaker use status input is input, for example. On the other hand, when the power of the acoustic signal is equal to or lower than the threshold value A or when the fixed speaker use status input is not input, the teacher label generation unit 405 assigns a label of not fixed speaker sound.

Thus, the teacher label generation unit 405 included by the fixed speaker identification device 400 in this example embodiment is configured so that the fixed speaker use status input is input therein. With such a configuration, the teacher label generation unit 405 can generate a label based on the fixed speaker use status input having been input. Consequently, it is possible to obtain the more accurate use status of the fixed speaker 121, and it is possible to increase the precision of the discrimination range DB 107.

In a case where the fixed speaker 121 has an external input, a signal generator for calibration can be connected to output a sound from the fixed speaker 121. In this case, it is possible to accurately control a time width to output a sound, and thus it is possible to more accurately generate a signal of a fixed speaker use status input.

Further, the fixed speaker identification device 400 may use in combination the generation of a label based on a fixed speaker use status input and the label generation methods described in the second, third, and fourth example embodiments.

Sixth Example Embodiment

Figure 22:
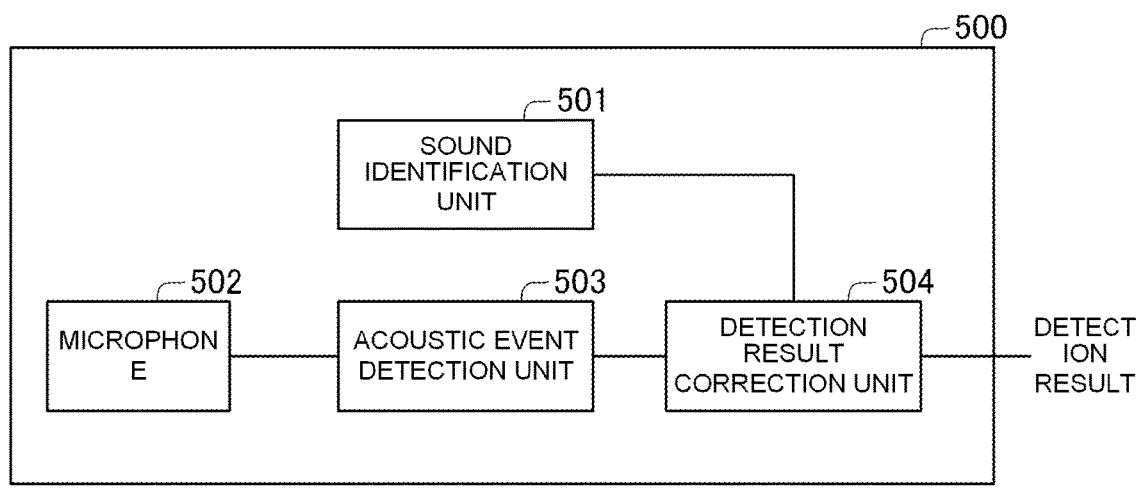
FIG. 22 is a view showing an example of the configuration of an acoustic event detection device in a sixth example embodiment of the present invention.

Next, a sixth example embodiment of the present invention will be described with reference to FIG. 22. FIG. 22 is a view showing an example of the configuration of an acoustic event detection device 500.

In the sixth example embodiment, the acoustic event detection device 500 that detects the acoustic event 122 will be described. The acoustic event detection device 500 described in this example embodiment includes a component corresponding to the sound identification unit described in the second example embodiment. Moreover, the acoustic event detection device 500 includes a component for detecting the acoustic event 122 in addition to the above component. As will be described later, the acoustic event detection device 500 determines a final detection result based on the detection result of the acoustic event 122 and the result of identification by the sound identification unit.

FIG. 22 shows an example of the configuration of the acoustic event detection device 500. Referring to FIG. 22, the acoustic event detection device 500 includes a sound identification unit 501, a microphone 502, an acoustic event detection unit 503, and a detection result correction unit 504. The acoustic event detection device 500 includes, for example, an arithmetic device such as a CPU that is not shown in the drawing and a storage device. For example, the acoustic event detection device 500 realizes the abovementioned respective processing units by execution of a program stored in a storage device that is not shown in the drawing by the arithmetic device.

The sound identification unit 501 has a plurality of its own microphones, and identifies whether or not a received acoustic signal is an acoustic signal from the fixed speaker 121. The configuration of the sound identification unit 501 is the same as the configuration of the sound identification unit included by the fixed speaker identification device 100 described in the second example embodiment, for example. Therefore, the detailed description of the configuration of the sound identification unit 501 will be omitted.

The microphone 502 converts surrounding sound data into signals. The microphone 502 is installed, for example, separately from the microphone included by the sound identification unit 501.

The acoustic event detection unit 503 detects whether or not the acoustic event 122 specified in advance has occurred from a time series of information of sounds obtained by the microphone 502. For example, the acoustic event detection unit 503 detects the acoustic event 122 in a case where the power (dimension) of an acoustic signal obtained by the microphone 502 is higher than a previously determined threshold value B (may be any value). Then, the acoustic event detection unit 503 outputs the detection result. The acoustic event detection unit 503 may detect the acoustic event 122 by a method other than the method illustrated above.

The detection result correction unit 504, when the acoustic event detection unit 503 outputs detection of the acoustic event 122, refers to an output by the sound identification unit 501 at the corresponding time. Then, the detection result correction unit 504 corrects the result of detection by the acoustic event detection unit 503 based on the output by the sound identification unit 501. For example, in a case where the result of identification by the sound identification unit 501 at the corresponding time is a fixed speaker sound, the detection result correction unit 504 deletes the result of detection by the acoustic event detection unit 503. In a case where the result of identification by the sound identification unit 501 at the corresponding time is not a fixed speaker sound, the detection result correction unit 504 does not correct the result of detection by the acoustic event detection unit 503. Thus, the detection result correction unit 504 corrects the detection result on the output by the acoustic event detection unit 503 by using the result by the sound identification unit 501 having its own microphone.

The configuration of the detection result correction unit 504 is not limited to the above one. For example, in a case where the output by the sound identification unit 501 is a fixed speaker sound, the detection result correction unit 504 may assign a flag that indicates identifying as a fixed speaker sound to the result of detection by the acoustic event detection unit 503, instead of suppressing (deleting) detection of the acoustic event 122. With this, the identification result can be transmitted to the side using the detection result. Moreover, the detection result correction unit 504 may be configured to, when the sound identification unit 501 identifies as a fixed speaker sound, not correct the detection result but delete the detection result.

Thus, the acoustic event detection device 500 includes the sound identification unit 501, the acoustic event detection unit 503, and the detection result correction unit 504. With such a configuration, the detection result correction unit 504 can correct the result of detection by the acoustic event detection unit 503 based on the result of identification by the sound identification unit 501. Consequently, the acoustic event detection device 500 can identify whether or not the detected acoustic event has been sounded by the fixed speaker 121, and detect only an acoustic event which is not output by the fixed speaker 121 as the acoustic event 122. As a result, for example, it becomes possible to not detect an acoustic event which is confused with the acoustic event 122, such as a scream in a drama broadcast on TV that is the fixed speaker 121, and it becomes possible to reduce false detection. The configuration to delete the detection result when it is determined as not a fixed speaker sound is favorable in the case of detecting the acoustic event 122 caused by a fixed target, not limited to the speaker. Such a configuration can be used, for example, for monitoring abnormal sound of a stationary playground equipment in an amusement park, or for detecting abnormal sound of equipment installed in a factory.

The acoustic event detection device 500 may have or may not have the components corresponding to the sound range learning unit among the components included by the fixed speaker identification device 100. In a case where the acoustic event detection device 500 includes a sound range learning unit, the sound range learning unit may be a modified example of any of those of the fixed speaker identification devices 200, 300, and 400. In a case where the acoustic event detection device 500 does not have a sound range learning unit, information indicating the identification range is stored into the discrimination range DB included by the sound identification unit 501 from an external device having the components corresponding to the sound range learning unit.

Seventh Example Embodiment

Figure 23:
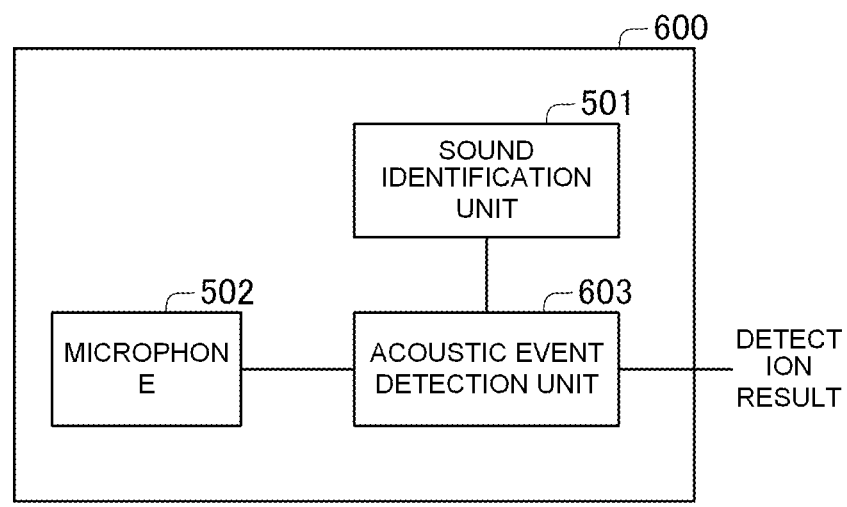
FIG. 23 is a view showing an example of the configuration of an acoustic event detection device in a seventh example embodiment of the present invention.

Next, a seventh example embodiment of the present invention will be described with reference to FIG. 23. FIG. 23 is a view showing an example of the configuration of an acoustic event detection device 600.

In the seventh example embodiment, the acoustic event detection device 600, which is a modified example of the acoustic event detection device 500 described in the sixth example embodiment, will be described. As will be described later, in the acoustic event detection device 600, the result of identification by the sound identification unit 501 is input into an acoustic event detection unit 603. The acoustic event detection device 600 changes a threshold value B used in detecting an acoustic event, based on the result of identification by the sound identification unit 501.

FIG. 23 shows an example of the configuration of the acoustic event detection device 600. Referring to FIG. 23, the acoustic event detection device 600 includes the sound identification unit 501, the microphone 502, and the acoustic event detection unit 603.

Thus, the acoustic event detection device 600 includes the acoustic event detection unit 603 instead of the acoustic event detection unit 503 included by the acoustic event detection device 500. Moreover, the acoustic event detection device 600 does not include a component corresponding to the detection result correction unit 504, and is configured to input the result of identification by the sound identification unit 501 into the acoustic event detection unit 603. The acoustic event detection unit 603 as a component that is characteristic to this example embodiment will be described below.

The acoustic event detection unit 603 detects whether or not the acoustic event 122 specified in advance has occurred from a time series of information of sound obtained by the microphone 502. For example, the acoustic event detection unit 603 detects the acoustic event 122 in a case where the power (dimension) of an acoustic signal obtained by the microphone 502 is higher than the threshold value B determined in advance (may be any value). Then, the acoustic event detection unit 603 outputs the result of detection.

Further, the acoustic event detection unit 603 changes the threshold value B based in an input from the sound identification unit 501. For example, the acoustic event detection unit 603 increases the threshold value B when the result of identification by the sound identification unit 501 is a fixed speaker sound. Consequently, the acoustic event detection unit 603 sets lower detection sensitivity during a time that the result of identification by the sound identification unit 501 is a fixed speaker sound.

Thus, the acoustic event detection device 600 is configured to input the result of detection by the sound identification unit 501 into the acoustic event detection unit 603. With such a configuration, the acoustic event detection unit 603 can change the threshold value B (change the detection sensitivity) based on the result of identification by the sound identification unit 501. Consequently, it is possible to reduce the possibility that a sound output by the fixed speaker 121 is detected as the acoustic event 122, and it is also possible to detect a quite distinct acoustic event 122 such as a loud scream or a malfunction sound. As a result, it is possible to reduce false rejection of the acoustic event 122 as compared with the acoustic event detection device 500, for example.

The acoustic event detection device 600 may include or may not include a component corresponding to the sound range learning unit, as in the acoustic event detection device 500.

Eighth Example Embodiment

Figure 24:
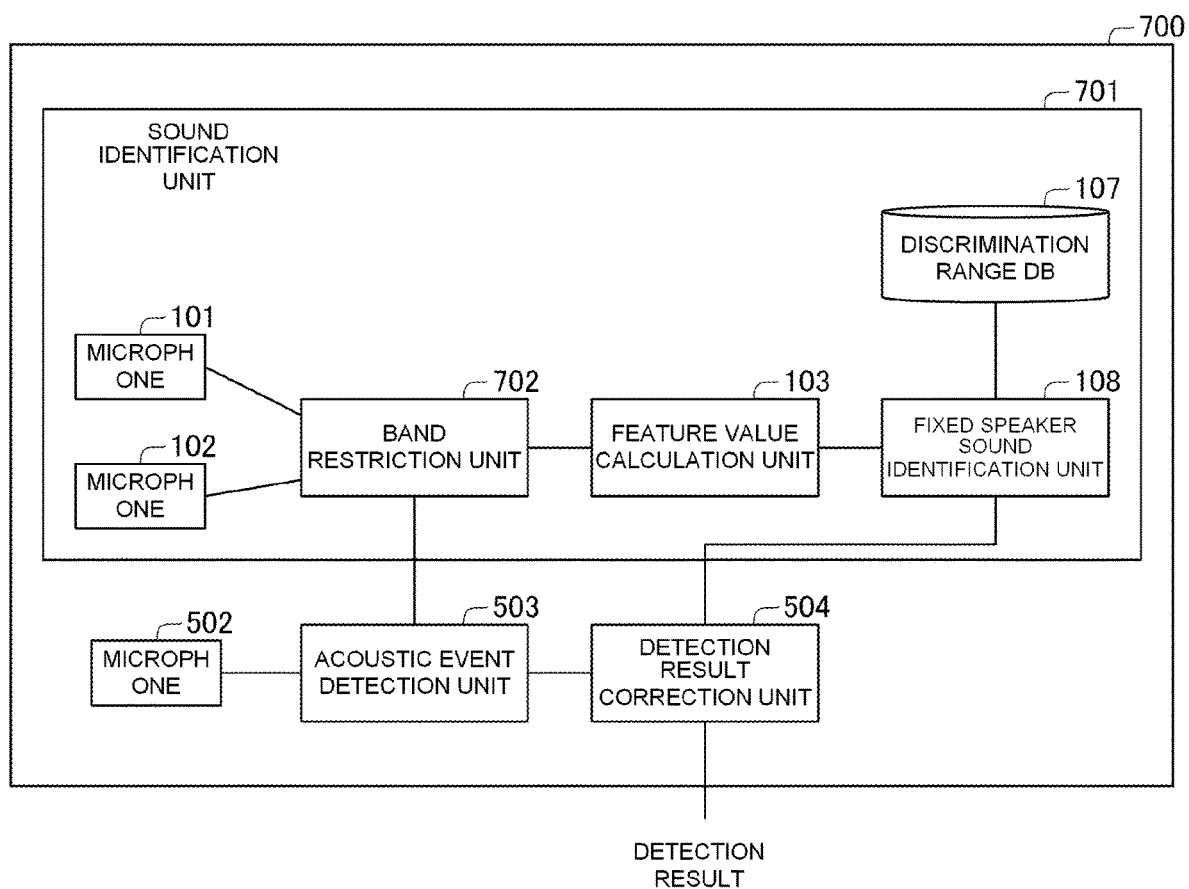
FIG. 24 is a view showing an example of the configuration of an acoustic event detection device in an eighth example embodiment of the present invention.

Next, an eighth example embodiment of the present invention will be described with reference to FIG. 24. FIG. 24 is a view showing an example of the configuration of an acoustic event detection device 700.

In the eighth example embodiment, the acoustic event detection device 700, which is a modified example of the acoustic event detection device 500 described in the sixth example embodiment, will be described. As will be described later, the acoustic event detection device 700 includes a band restriction unit 702 in a sound identification unit 701. The sound identification unit 701 restricts a band to only a central frequency band forming the acoustic event 122 detected by the acoustic event detection unit 503 and then identifies whether or not to be an acoustic signal output by the fixed speaker 121.

FIG. 24 shows an example of the configuration of the acoustic event detection device 700. Referring to FIG. 24, the acoustic event detection device 700 includes the sound identification unit 701, the microphone 502, the acoustic event detection unit 503, and the detection result correction unit 504.

Thus, the acoustic event detection device 700 includes the sound identification unit 701 instead of the sound identification unit 501 included by the acoustic event detection device 500. The sound identification unit 701 as a component that is characteristic to this example embodiment will be described below.

The sound identification unit 701 includes a plurality of its own microphones, and identifies whether or not a received acoustic signal is an acoustic signal output by the fixed speaker 121. The sound identification unit 701 includes the band restriction unit 702 in addition to the components of the sound identification unit included by the fixed speaker identification device 100 described in the second example embodiment. To be specific, the sound identification unit 701 is configured to input an acoustic signal received by the microphone 101, 102 into the feature value calculation unit 102 via the band restriction unit 702.

Into the band restriction unit 702, information indicating a central frequency band forming an acoustic event detected by the acoustic event detection unit 402 is input from the acoustic event detection unit 402. The band restriction unit 702 performs band restriction based on the input information. In other words, the band restriction unit 702 outputs only a central frequency band forming an acoustic event detected by the acoustic event detection unit 402 of an acoustic signal received by the microphone 101, 102, to the feature value calculation unit 103. The band restriction unit 702 performs band restriction, which enables the fixed speaker sound identification unit 108 of the sound identification unit 701 to restrict the band to only the central frequency band forming the acoustic event and then identify whether or not the acoustic signal is a fixed speaker sound.

Thus, the acoustic event detection device 700 has the sound identification unit 701 including the band restriction unit 702. The band restriction unit 702 is configured so that information indicating a central frequency band forming an acoustic event detected by the acoustic event detection unit 402 is input therein. With such a configuration, the acoustic event detection device 700 can restrict a band to only a central frequency band forming an acoustic event and then discriminate whether or not the received acoustic signal is a fixed speaker sound. Consequently, it is possible to increase the accuracy of identification even in a case where a plurality of acoustic events are mixed or in noisy environments.

Ninth Example Embodiment

Figure 25:
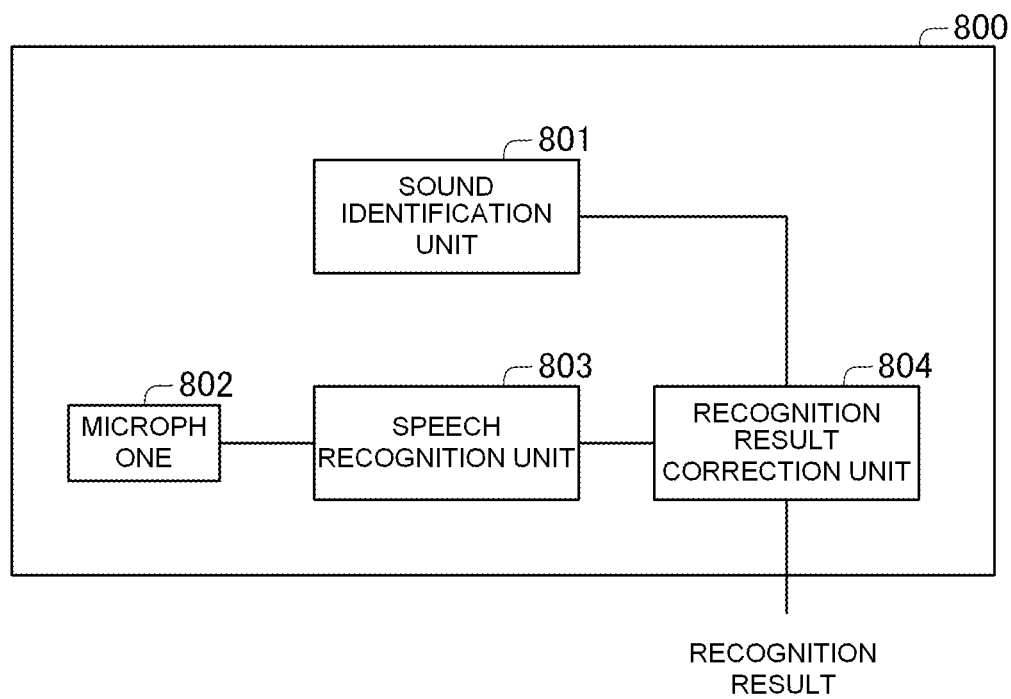
FIG. 25 is a view showing an example of the configuration of an audio recognition device in a ninth example embodiment of the present invention.

Next, a ninth example embodiment of the present invention will be described with reference to FIG. 25. FIG. 25 is a view showing an example of the configuration of an audio recognition device 800.

In the ninth example embodiment, the audio recognition device 800 that performs audio recognition will be described. The audio recognition device 800 described in this example embodiment includes a component corresponding to the sound identification unit described using the second example embodiment. Moreover, the audio recognition device 800 includes a component for performing audio recognition in addition to the above component. As will be described later, the audio recognition device 800 determines a final detection result based on the result of audio recognition and the result of identification by the sound identification unit.

FIG. 25 shows an example of the configuration of the audio recognition device 800. Referring to FIG. 25, the audio recognition device 800 includes a sound identification unit 801, a microphone 802, an audio recognition unit 803, and a recognition result correction unit 804. The audio recognition device 800 includes, for example, an arithmetic device such a CPU that is not shown in the drawing and a storage device. For example, the audio recognition device 800 realizes the abovementioned respective processing units by execution of a program stored in a storage device that is not shown in the drawing by the arithmetic device.

The sound identification unit 801 includes a plurality of its own microphones, and identifies whether or not a received acoustic signal is an acoustic signal output by the fixed speaker 121. The configuration of the sound identification unit 801 is the same as the configuration of the sound identification unit included by the fixed speaker identification device 100 described in the second example embodiment, for example. Therefore, a detailed description of the configuration of the sound identification unit 801 will be omitted.

The microphone 802 converts surrounding sound data into signals. The microphone 802 is installed separately from the microphones included by the sound identification unit 801, for example.

The audio recognition unit 803 performs audio recognition from a time series of information of sound obtained by the microphone 802. Then, the audio recognition unit 803 outputs an audio recognition result. The form of the audio recognition result is, for example, a word ID or a text.

In this example embodiment, a specific configuration of the audio recognition unit 803 is not limited specifically. The audio recognition unit 803 can be configured to perform a general audio recognition process, for example, perform word spotting to extract a predetermined word from a time series of information of sound obtained by the microphone 802.

When the audio recognition unit 803 performs specific audio recognition by word spotting, the recognition result correction unit 804 refers to the output by the sound identification unit 801 at the corresponding time. Then, in a case where the result at the corresponding time is a fixed speaker sound, the recognition result correction unit 804 deletes the corresponding recognition result. On the other hand, in a case where the result at the corresponding time is not a fixed speaker sound, the recognition result correction unit 804 outputs the output by the audio recognition unit 803 as the recognition result as it is.

Thus, the audio recognition device 800 includes the sound identification unit 801, the audio recognition unit 803, and the recognition result correction unit 804. With such a configuration, the recognition result correction unit 804 can correct the result of recognition by the audio recognition unit 803 based on the result of identification by the sound identification unit 801. Consequently, it is possible to, when performing recognition of audio, identify whether or not the audio is sounded by the fixed speaker 121, and recognize only a sound that is not output by the fixed speaker 121 as audio. As a result, a sound which is confused with recognition target audio is not recognized, for example, when a command word for audio recognition is broadcast on TV that is the fixed speaker 121, so that it is possible to reduce false detection.

As shown in FIG. 25, the audio recognition device 800 has a similar configuration to that of the acoustic event detection device 500 described in the sixth example embodiment. The audio recognition device 800 can also be designed for acoustic event detection as described in the sixth, seventh, and eighth example embodiments.

Tenth Example Embodiment

Figure 26:
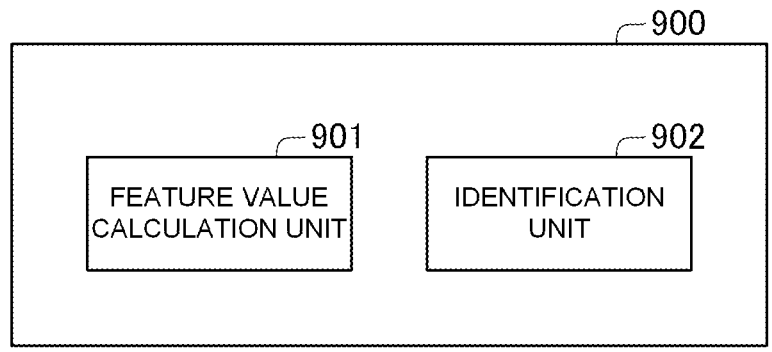
FIG. 26 is a view showing an example of the configuration of a signal source identification device in a tenth example embodiment of the present invention.
Figure 27:
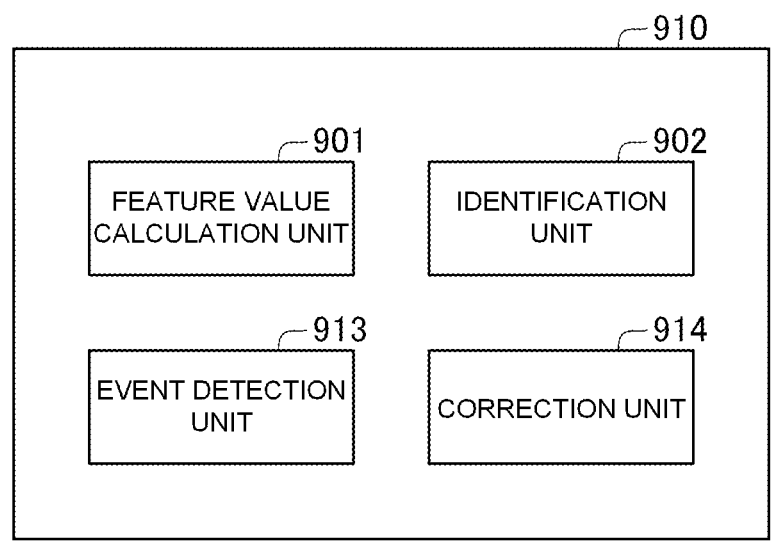
FIG. 27 is a view showing an example of the configuration of an event detection device in the tenth example embodiment of the present invention.
Figure 28:
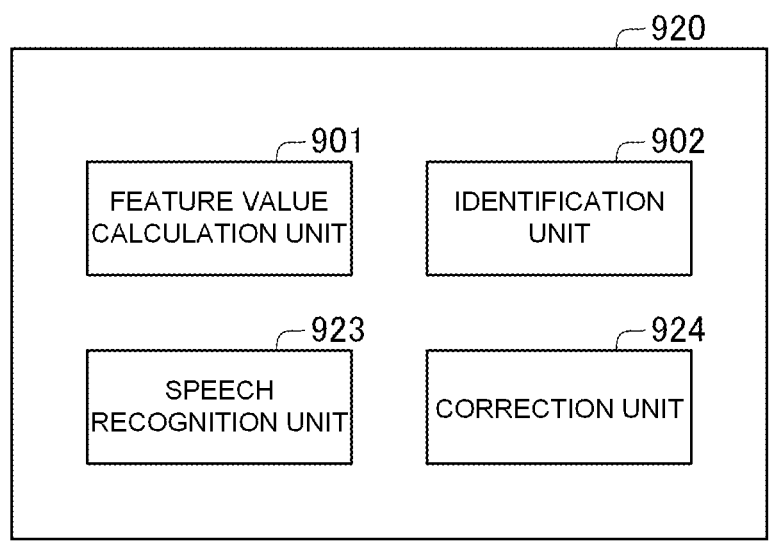
FIG. 28 is a view showing an example of the configuration of an audio recognition device in the tenth example embodiment of the present invention.

Next, a tenth example embodiment of the present invention will be described with reference to FIGS. 26 to 28. FIG. 26 is a view showing an example of the configuration of a signal source identification device 900. FIG. 27 is a view showing an example of the configuration of an event detection device 910. FIG. 28 is a view showing an example of the configuration of an audio recognition device 920.

In the tenth example embodiment of the present invention, the configurations of the signal source identification device 900, the event detection device 910, and the audio recognition device 920 will be described.

FIG. 26 shows an example of the configuration of the signal source identification device 900. Referring to FIG. 26, the signal source identification device 900 includes a feature value calculation unit 901 and an identification unit 902. The signal source identification device 900 includes, for example, an arithmetic device such as a CPU that is not shown in the drawing and a storage device. For example, the signal source identification device 900 realizes the abovementioned respective processing units by execution of a program stored in a storage device that is not shown in the drawing by the arithmetic device.

The feature value calculation unit 901 calculates feature values corresponding to paths where signals from generation sources transmit, based on signals received by a plurality of sensors.

The identification unit 902 identifies whether or not a feature value calculated by the feature value calculation unit 901 is a signal from a predetermined signal source by using an identification range that is a range within which feature values based on signals from the predetermined signal source fall and that is determined based on the feature values calculated by the feature value calculation unit 901.

Thus, the signal source identification device 900 includes the feature value calculation unit 901 and the identification unit 902. With such a configuration, the identification unit 902 of the signal source identification device 900 can identify by using an identification range whether or not a feature value calculated by the feature value calculation unit 901 is a signal from a predetermined signal source. By identifying based on the identification range in this manner, it is possible to stably detect whether or not a signal is a signal output by a predetermined signal source without depending on the frequency characteristic of the signal. In other words, it is possible to easily detect that a signal is a signal output by a predetermined source.

Further, the signal source identification device 900 described above can be realized by installation of a predetermined program into the signal source identification device 900. To be specific, a program according to another aspect of the present invention is a program including instructions for causing the signal source identification device 900 to realize: the feature value calculation unit 901 configured to calculate feature values corresponding to paths where signals from generation sources of the signals transmit, based on signals received by a plurality of sensors; and the identification unit 902 configured to identify whether or not a feature value calculated by the feature value calculation unit 901 is a signal from a predetermined signal source by using an identification range that is a range within which feature values based on signals from the predetermined signal source fall and that is previously determined based on the feature values calculated by the feature value calculation unit 901.

Further, a signal source identification method executed by the signal source identification device 900 described above is a method including, by the signal source identification device 900: calculating feature values corresponding to paths where signals from generation sources of the signals transmit, based on signals received by a plurality of sensors; and identifying whether or not a calculated feature value is a signal from a predetermined signal source by using an identification range that is a range within which feature values based on signals from the predetermined signal source fall and that is previously determined based on the calculated feature values.

The inventions of the program and the signal source identification method with the above configurations each have the same action as the signal source identification device 900, and therefore can achieve the object of the present invention.

Further, devices in which the signal source identification device 900 is used are an event detection device 910 and an audio recognition device 920. FIG. 27 shows an example of the configuration of an event detection device 910. FIG. 28 shows an example of the configuration of the audio recognition device 920.

Referring to FIG. 27, the event detection device 910 includes the feature value calculation unit 901, the identification unit 902, an event detection unit 913, and a correction unit 914. The event detection device 910 includes, for example, an arithmetic device such as a CPU that is not shown in the drawing and a storage device. For example, the event detection device 910 realizes the abovementioned respective processing units by execution of a program stored in a storage device that is not shown in the drawing by the arithmetic device.

Of the above components, the feature value calculation unit 901 and the identification unit 902 are the same as the components included by the signal source identification device 900. Therefore, it can be said that the event detection device 910 includes the components included by the signal source identification device 900, the event detection unit 913, and the correction unit 914.

The event detection unit 913 detects an event based on a signal received by a sensor. The correction unit 914 corrects the result of detection by the event detection unit 913 based on the result of identification by the identification unit 902 included by the signal source identification device.

Further, the abovementioned event detection device 910 can be realized by installation of a predetermined program into the event detection device 910. To be specific, a program according to another aspect of the present invention is a program including instructions for causing the event detection device 910 to realize: the feature value calculation unit 901 configured to calculate feature values corresponding to paths where signals from generation sources of the signals transmit, based on signals received by a plurality of sensors; the identification unit configured to identify whether or not a feature value calculated by the feature value calculation unit 901 is a signal from a predetermined signal source by using an identification range that is a range within which feature values based on signals from the predetermined signal source fall and that is previously determined based on the feature values calculated by the feature value calculation unit 901; the event detection unit 913 configured to detect an event based on a signal received by a sensor; and the correction unit 914 configured to correct a result of detection by the event detection unit 913 based on a result of identification by the identification unit 902.

Further, an event detection method executed by the abovementioned event detection device 910 is a method including, by the event detection device 910: calculating feature values corresponding to paths where signals from generation sources of the signals transmit, based on signals received by a plurality of sensors; identifying whether or not a calculated feature value is a signal from a predetermined signal source by using an identification range that is a range within which feature values based on signals from the predetermined signal source fall and that is previously determined based on the calculated feature values; detecting an event based on a signal received by a sensor; and correcting a result of detection of the event based on a result of the identification.

According to the inventions of the event detection device, the program, and the event detection method with the abovementioned configurations, it is possible to correct the result of detection of an event based on the result of identification whether or not to be a signal from a predetermined signal source. Consequently, for example, it is possible to reduce the possibility that a signal from a predetermined signal source is falsely detected as a signal due to an event.

Further, referring to FIG. 28, the audio recognition device 920 includes the feature value calculation unit 901, the identification unit 902, an audio recognition unit 923, and a correction unit 924. The audio recognition device 920 includes, for example, an arithmetic device such as a CPU that is not shown in the drawing and a storage device. For example, the audio recognition device 920 realizes the abovementioned respective processing units by execution of a program stored in a storage device that is not shown in the drawing by the arithmetic device.

Of the above components, the feature value calculation unit 901 and the identification unit 902 are the same as the components included by the signal source identification device 900. Therefore, it can be said that the audio recognition device 920 includes the components included by the signal source identification device 900, the audio recognition unit 923, and the correction unit 924.

The audio recognition unit 923 performs audio recognition based on an acoustic signal received by a microphone serving as a sensor. The correction unit 924 corrects the result of recognition by the audio recognition unit 923 based on the result of identification by the signal source identification device.

Further, the abovementioned audio recognition device 920 can be realized by installation of a predetermined program into the audio recognition device 920. To be specific, a program according to another aspect of the present invention is a program including instructions for causing the audio recognition device 920 to realize: the feature value calculation unit 901 configured to calculate feature values corresponding to paths where signals from generation sources of the signals transmit, based on signals received by a plurality of sensors; the identification unit configured to identify whether or not a feature value calculated by the feature value calculation unit 901 is a signal from a predetermined signal source by using an identification range that is a range within which feature values based on signals from the predetermined signal source fall and that is previously determined based on the feature values calculated by the feature value calculation unit 901; the audio recognition unit 923 configured to perform audio recognition based on an acoustic signal received by a microphone serving as a sensor; and the correction unit configured to correct a result of recognition by the audio recognition unit 923 based on a result of identification by the identification unit 902.

Further, an audio recognition method executed by the abovementioned audio recognition device 920 is a method including, by the audio recognition device 920: calculating feature values corresponding to paths where signals from generation sources of the signals transmit, based on signals received by a plurality of sensors; identifying whether or not a calculated feature value is a signal from a predetermined signal source by using an identification range that is a range within which feature values based on signals from the predetermined signal source fall and that is previously determined based on the calculated feature values; performing audio recognition based on an acoustic signal received by a microphone serving as a sensor; and correcting a result of audio recognition based on a result of the identification.

According to the inventions of the audio recognition device, the program, and the audio recognition method with the abovementioned configurations, it is possible to correct the result of audio recognition based on the result of identification whether or not to be a signal from a predetermined signal source. Consequently, for example, it is possible to prevent audio recognition from being falsely performed based on a signal from a predetermined signal source.

Supplementary Notes

The whole or part of the example embodiments disclosed above can be described as the following supplementary notes. Below, the overview of the signal source identification device and so on according to the present invention will be described. However, the present invention is not limited to the following configurations.
(Supplementary Note 1)
A signal source identification device comprising:
a feature value calculation unit configured to calculate feature values corresponding to paths where signals from generation sources of the signals transmit, based on signals received by a plurality of sensors; and
an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit.
(Supplementary Note 2)
The signal source identification device according to Supplementary Note 1, wherein
the identification unit is configured to identify as the signal from the predetermined signal source in a case where the feature value calculated by the feature value calculation unit falls within the identification range.
(Supplementary Note 3)
The signal source identification device according to Supplementary Note 1 or 2, wherein
the identification unit is configured to identify as not the signal from the predetermined signal source in a case where the feature value calculated by the feature value calculation unit does not fall within the identification range.
(Supplementary Note 4)
The signal source identification device according to any one of Supplementary Notes 1 to 3, further comprising:
a label generation unit configured to generate a label indicating whether or not to be the signal from the predetermined source; and
an identification range determination unit configured to determine the identification range based on the feature values calculated by the feature value calculation unit and the label generated by the label generation unit.
(Supplementary Note 5)
The signal source identification device according to Supplementary Note 4, wherein
the label generation unit is configured to generate the label based on dimensions of the signals received by the plurality of sensors and the feature value calculated by the feature value calculation unit.
(Supplementary Note 6)
The signal source identification device according to Supplementary Note 4 or 5, wherein
the label generation unit is configured to extract, based on the dimensions of the signals received by the plurality of sensors, part of the signals and generate the label based on average value and variance of feature values calculated based on the extracted part of the signals.
(Supplementary Note 7)
The signal source identification device according to Supplementary Note 4 or 5, wherein
the label generation unit is configured to generate the label based on a range in which the feature values calculated by the feature value calculation unit concentrate.
(Supplementary Note 8)
The signal source identification device according to any one of Supplementary Notes 4 to 7, wherein
the label generation unit is configured to weight the feature value calculated by the feature value calculation unit according to time and generate the label.
(Supplementary Note 9)
The signal source identification device according to any one of Supplementary Notes 4 to 8, comprising a scheduler configured to record a schedule indicating a use status of the predetermined signal source, wherein the label generation unit is configured to generate the label based on an output from the scheduler.

(Supplementary Note 10)

The signal source identification device according to any one of Supplementary Notes 4 to 9, wherein the label generation unit is configured to generate the label based on use status information that is information corresponding to the use status of the predetermined signal source, and that is input from outside.

(Supplementary Note 11)

A signal source identification method executed by a signal source identification device, the method comprising:

calculating feature values corresponding to paths where signals from generation sources of the signals transmit, based on signals received by a plurality of sensors; and identifying whether or not a calculated feature value is a signal from a predetermined signal source by using an identification range that is a range within which feature values based on signals from the predetermined signal source fall and that is previously determined based on the calculated feature values.

(Supplementary Note 12)

A computer program comprising instructions for causing a signal source identification device to realize:

a feature value calculation unit configured to calculate feature values corresponding to paths where signals from generation sources of the signals transmit, based on signals received by a plurality of sensors; and an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit.

(Supplementary Note 12-1)

A non-transitory computer-readable recording medium having a program recorded thereon, the program comprising instructions for causing a signal source identification device to realize:

a feature value calculation unit configured to calculate feature values corresponding to paths where signals from generation sources of the signals transmit, based on signals received by a plurality of sensors; and an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit.

(Supplementary Note 13)

An event detection device comprising:

a feature value calculation unit configured to calculate feature values corresponding to paths where signals from generation sources of the signals transmit, based on signals received by a plurality of sensors;

an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit;

an event detection unit configured to detect an event based on a signal received by a sensor; and a correction unit configured to correct a result of the detection by the event detection unit based on a result of the identification by the signal source identification device.

(Supplementary Note 14)

The event detection device according to Supplementary Note 13, wherein the signal source identification device includes a band restriction unit configured to restrict a band based on the result of the detection by the event detection unit.

(Supplementary Note 15)

An event detection device comprising:

a feature value calculation unit configured to calculate feature values corresponding to paths where signals from generation sources of the signals transmit, based on signals received by a plurality of sensors;

an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit; and an event detection unit configured to detect an event based on a signal received by a sensor, wherein the event detection unit is configured to change a threshold value used in detecting the event based on a result of the identification by the signal source identification device.

(Supplementary Note 16)

An event detection method executed by an event detection device, the method comprising:

calculating feature values corresponding to paths where signals from generation sources of the signals transmit, based on signals received by a plurality of sensors;

identifying whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit;

detecting an event based on a signal received by a sensor; and correcting a result of the detection of the event based on a result of the identification.

(Supplementary Note 17)

A computer program comprising instructions for causing an event detection device to realize:

a feature value calculation unit configured to calculate feature values corresponding to paths where signals from generation sources of the signals transmit, based on signals received by a plurality of sensors;

an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit;

an event detection unit configured to detect an event based on a signal received by a sensor; and a correction unit configured to correct a result of the detection by the event detection unit based on a result of the identification by the identification unit.

(Supplementary Note 17-1)

A non-transitory computer-readable recording medium having a program recorded thereon, the program comprising instructions for causing an event detection device to realize:

a feature value calculation unit configured to calculate feature values corresponding to paths where signals from generation sources of the signals transmit, based on signals received by a plurality of sensors;

an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit;

an event detection unit configured to detect an event based on a signal received by a sensor; and a correction unit configured to correct a result of the detection by the event detection unit based on a result of the identification by the identification unit.

(Supplementary Note 18)

An audio recognition device comprising:

a feature value calculation unit configured to calculate feature values corresponding to paths where signals from generation sources of the signals transmit, based on signals received by a plurality of sensors;

an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit;

an audio recognition unit configured to perform audio recognition based on an acoustic signal received by a microphone serving as a sensor; and a correction unit configured to correct a result of the recognition by the audio recognition unit based on a result of the identification by the signal source identification device.

(Supplementary Note 19)

An audio recognition method executed by an audio recognition device, the method comprising:

calculating feature values corresponding to paths where signals from generation sources of the signals transmit, based on signals received by a plurality of sensors;

identifying whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit;

performing audio recognition based on an acoustic signal received by a microphone serving as a sensor; and correcting a result of the audio recognition based on a result of the identification.

(Supplementary Note 20)

A computer program comprising instructions for causing an audio recognition device to realize:

a feature value calculation unit configured to calculate feature values corresponding to paths where signals from generation sources of the signals transmit, based on signals received by a plurality of sensors;

an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit;

an audio recognition unit configured to perform audio recognition based on an acoustic signal received by a microphone serving as a sensor; and a correction unit configured to correct a result of the recognition by the audio recognition unit based on a result of the identification by the identification unit.

(Supplementary Note 20-1)

A non-transitory computer-readable recording medium having a program recorded thereon, the program comprising instructions for causing an audio recognition device to realize: a feature value calculation unit configured to calculate feature values corresponding to paths where signals from generation sources of the signals transmit, based on signals received by a plurality of sensors;

an identification unit configured to identify whether or not a feature value calculated by the feature value calculation unit is a signal from a predetermined signal source by using an identification range that is a range within which feature values based on signals from the predetermined signal source fall and that is previously determined based on the feature values calculated by the feature value calculation unit;

an audio recognition unit configured to perform audio recognition based on an acoustic signal received by a microphone serving as a sensor; and a correction unit configured to correct a result of the recognition by the audio recognition unit based on a result of the identification by the identification unit.

The program described in the example embodiments and supplementary notes is stored in a storage device or recorded on a computer-readable recording medium. For example, the recording medium is a portable medium such as a flexible disk, an optical disk, a magnetooptical disk, and a semiconductor memory.

Although the present invention has been described above with reference to the example embodiments, the present invention is not limited to the example embodiments. The configurations and details of the present invention can be changed in various manners that can be understood by those skilled in the art within the scope of the present invention.

DESCRIPTION OF NUMERALS 000 fixed signal source identification device
001, 002 sensor
003 feature value calculation unit
004 feature value store
005 teacher label generation unit
006 fixed signal source output range determination unit
007 discrimination range DB
008 fixed signal source output signal identification unit
021 fixed signal source
022 mobile signal source
100 fixed speaker identification device
101, 102 microphone 103 feature value calculation unit
104 feature value store
105 teacher label generation unit
106 fixed speaker sound range determination unit
107 discrimination range DB
108 fixed speaker sound identification unit
121 fixed speaker
122 acoustic event
200 fixed speaker identification device
205 teacher label generation unit
300 fixed speaker identification device
305 teacher label generation unit
309 scheduler
400 fixed speaker identification device
405 teacher label generation unit
500 acoustic event detection device
501 sound identification unit
502 microphone
503 acoustic event detection unit
504 detection result correction unit
600 acoustic event detection device
603 acoustic event detection unit
700 acoustic event detection device
701 sound identification unit
702 band restriction unit
800 audio recognition device
801 sound identification unit
802 microphone
803 audio recognition unit
804 recognition result correction unit
900 signal source identification device
901 feature value calculation unit
902 identification unit
910 event detection device
913 event detection unit
914 correction unit
920 audio recognition device
923 audio recognition unit
924 correction unit

What is claimed is:

1. A signal source identification device comprising:
a feature value calculation unit configured to calculate feature values that represent paths where signals from generation sources of the signals transmit, by calculating a cross spectrum based on signals received by a plurality of sensors;
an identification unit configured to identify whether or not a feature value, calculated by the feature value calculation unit, is a signal from a predetermined signal source by using an identification range that is a range within which feature values based on signals from the predetermined signal source fall and that is previously determined based on the feature values that are based on the signals from the predetermined signal source and feature values that are based on signals from a signal source other than the predetermined signal source;
a label generation unit configured to generate a label indicating whether or not to be the signal from the predetermined source;
an identification range determination unit configured to determine the identification range based on the feature values calculated by the feature value calculation unit and the label generated by the label generation unit; and
a scheduler configured to record a schedule indicating a use status of the predetermined signal source,
wherein the label generation unit is configured to generate the label based on an output from the scheduler.

2. The signal source identification device according to claim 1, wherein
the identification unit is configured to identify as the signal from the predetermined signal source in a case where the feature value calculated by the feature value calculation unit falls within the identification range.

3. The signal source identification device according to claim 1, wherein
the identification unit is configured to identify as not the signal from the predetermined signal source in a case where the feature value calculated by the feature value calculation unit does not fall within the identification range.

4. The signal source identification device according to claim 1, wherein
the label generation unit is configured to generate the label based on dimensions of the signals received by the plurality of sensors and the feature value calculated by the feature value calculation unit.

5. The signal source identification device according to claim 1, wherein
the label generation unit is configured to extract, based on the dimensions of the signals received by the plurality of sensors, part of the signals and generate the label based on average value and variance of feature values calculated based on the extracted part of the signals.

6. The signal source identification device according to claim 1, wherein
the label generation unit is configured to generate the label based on a range in which the feature values calculated by the feature value calculation unit concentrate.

7. The signal source identification device according to claim 1, wherein
the label generation unit is configured to weight the feature value calculated by the feature value calculation unit according to time and generate the label.

8. The signal source identification device according to claim 1, wherein
the label generation unit is configured to generate the label based on use status information that is information corresponding to the use status of the predetermined signal source, and that is input from outside.

9. A signal source identification method executed by a signal source identification device, the method comprising:
calculating feature values that represent paths where signals from generation sources of the signals transmit, by calculating a cross spectrum based on signals received by a plurality of sensors; and
identifying whether or not a calculated feature value is a signal from a predetermined signal source by using an identification range that is a range within which feature values based on signals from the predetermined signal source fall and that is previously determined based on the calculated feature values that are based on the signals from the predetermined signal source and the calculated feature values that are based on signals from a signal source other than the predetermined signal source;
generating a label indicating whether or not to be the signal from the predetermined source;
determining the identification range based on the calculated feature values and the label; and
recording a schedule indicating a use status of the predetermined signal source,
wherein the generating the label is based on the schedule.

10. An event detection device comprising:
a feature value calculation unit configured to calculate feature values that represent paths where signals from generation sources of the signals transmit, by calculating a cross spectrum based on signals received by a plurality of sensors;
an identification unit configured to identify whether or not a feature value, calculated by the feature value calculation unit, is a signal from a predetermined signal source by using an identification range that is a range within which feature values based on signals from the predetermined signal source fall and that is previously determined based on the feature values that are based on the signals from the predetermined signal source and feature values that are based on signals from a signal source other than the predetermined signal source;
an event detection unit configured to detect an event based on a signal received by a sensor;
a correction unit configured to correct a result of the detection by the event detection unit based on a result of the identification by the signal source identification device;
a label generation unit configured to generate a label indicating whether or not to be the signal from the predetermined source;
an identification range determination unit configured to determine the identification range based on the feature values calculated by the feature value calculation unit and the label generated by the label generation unit; and
a scheduler configured to record a schedule indicating a use status of the predetermined signal source,
wherein the label generation unit is configured to generate the label based on an output from the scheduler.

11. The event detection device according to claim 10, wherein
the signal source identification device includes a band restriction unit configured to restrict a band based on the result of the detection by the event detection unit.

* * * * *